(12) United States Patent
Curtis

(10) Patent No.: US 7,025,543 B2
(45) Date of Patent: Apr. 11, 2006

(54) METHOD OF AUTOMATED COOLANT DELIVERY FOR A MACHINE TOOL

(76) Inventor: Gary L. Curtis, 4425 Fawn Trail, Loveland, CO (US) 80537

( * ) Notice: Subject to any disclaimer, the term of this patent is extended or adjusted under 35 U.S.C. 154(b) by 117 days.

(21) Appl. No.: 10/755,150

(22) Filed: Jan. 9, 2004

(65) Prior Publication Data
US 2004/0141819 A1 Jul. 22, 2004

Related U.S. Application Data

(62) Division of application No. 10/118,678, filed on Apr. 9, 2002, now Pat. No. 6,715,971.

(60) Provisional application No. 60/282,541, filed on Apr. 9, 2001.

(51) Int. Cl.
B23Q 11/10 (2006.01)

(52) U.S. Cl. .......................... 409/131; 409/136; 408/61

(58) Field of Classification Search ................ 409/131, 409/132, 135, 136, 137; 408/61, 62; 239/587.1, 239/587.5, 587.6
See application file for complete search history.

(56) References Cited

U.S. PATENT DOCUMENTS

| | | | | | |
|---|---|---|---|---|---|
| 3,836,084 | A | * | 9/1974 | Luke | 239/587.2 |
| 4,573,833 | A | * | 3/1986 | Kondo | 409/136 |
| 4,597,697 | A | * | 7/1986 | Shaffer | 409/136 |
| 4,708,539 | A | * | 11/1987 | Threadgill | 409/136 |
| 4,822,218 | A | * | 4/1989 | Satoh | 409/136 |
| 5,186,394 | A | * | 2/1993 | Tsuji | 239/587.4 |
| 5,444,634 | A | * | 8/1995 | Goldman et al. | 700/169 |
| 6,123,268 | A | * | 9/2000 | Chastine | 239/587.4 |
| 6,123,270 | A | * | 9/2000 | Hara | 408/61 |
| 6,123,606 | A | * | 9/2000 | Hill et al. | 451/53 |
| 6,164,881 | A | * | 12/2000 | Shono | 409/137 |

FOREIGN PATENT DOCUMENTS

EP 331440 A1 * 9/1989

* cited by examiner

Primary Examiner—Boyer D. Ashley
Assistant Examiner—Dana Ross
(74) Attorney, Agent, or Firm—John E. Reilly

(57) ABSTRACT

A method and apparatus for directing a coolant stream onto a cutting tool is made up of a nozzle pivotally mounted on a machine tool, the nozzle being automatically adjusted in response to movement of the machine tool via a retractable plunger or other linear drive member so as to cause the coolant stream to intersect the interface between a workpiece and each cutting tool that is brought into cutting position on the machine tool; and the nozzle is pivotal between a reference position and a different intermediate position corresponding to the length or diameter of the cutting tool which is advanced into cutting position.

8 Claims, 19 Drawing Sheets

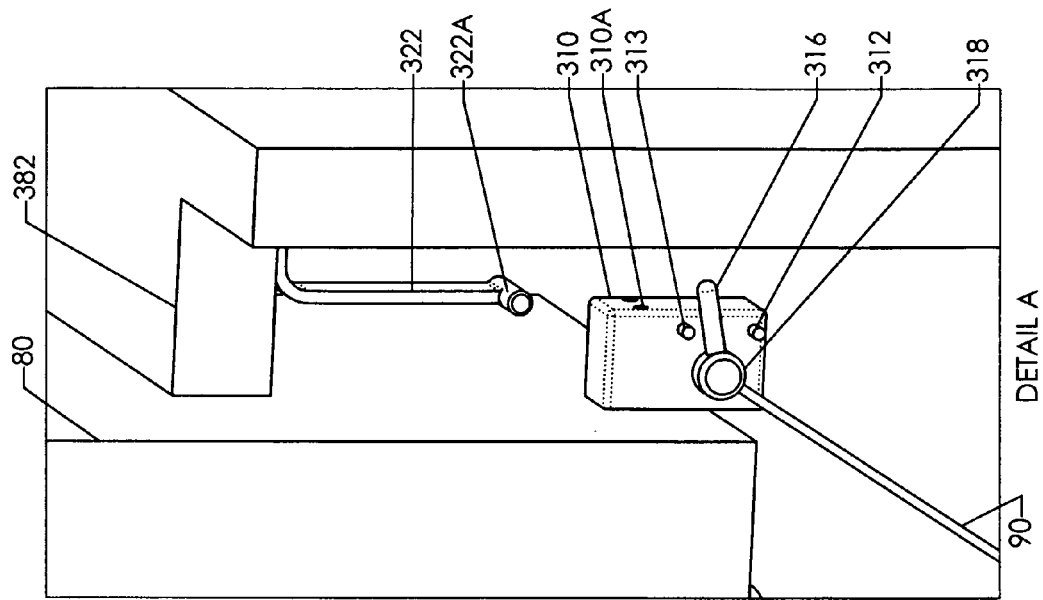
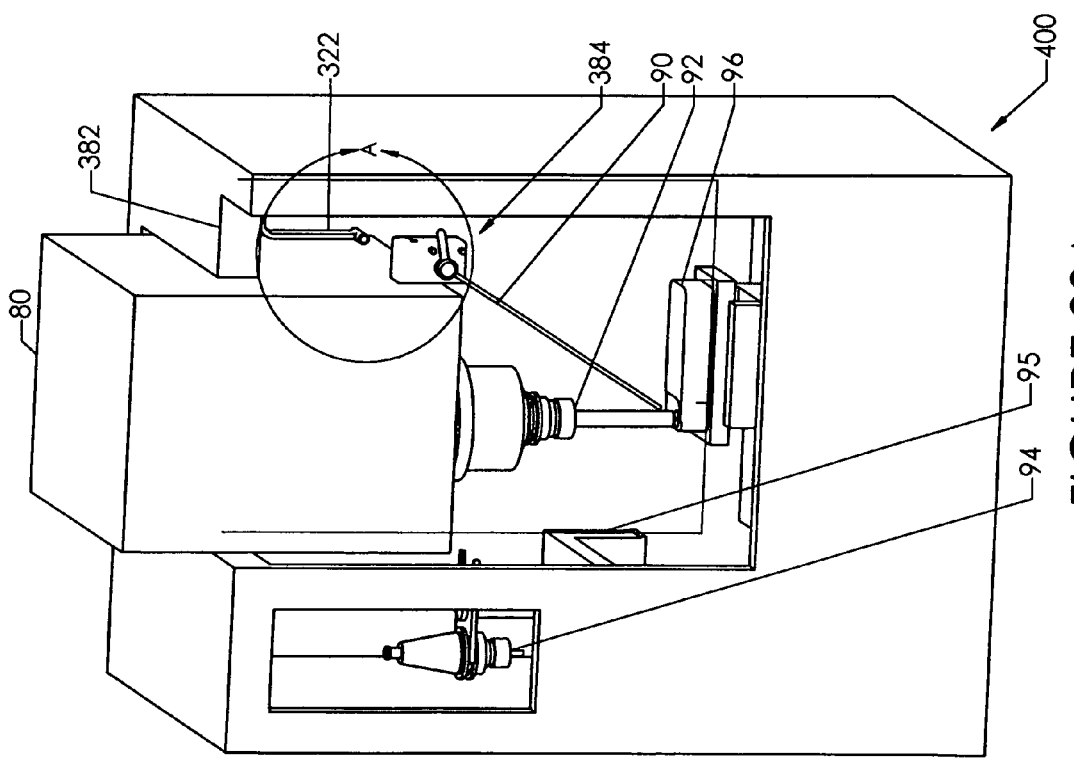

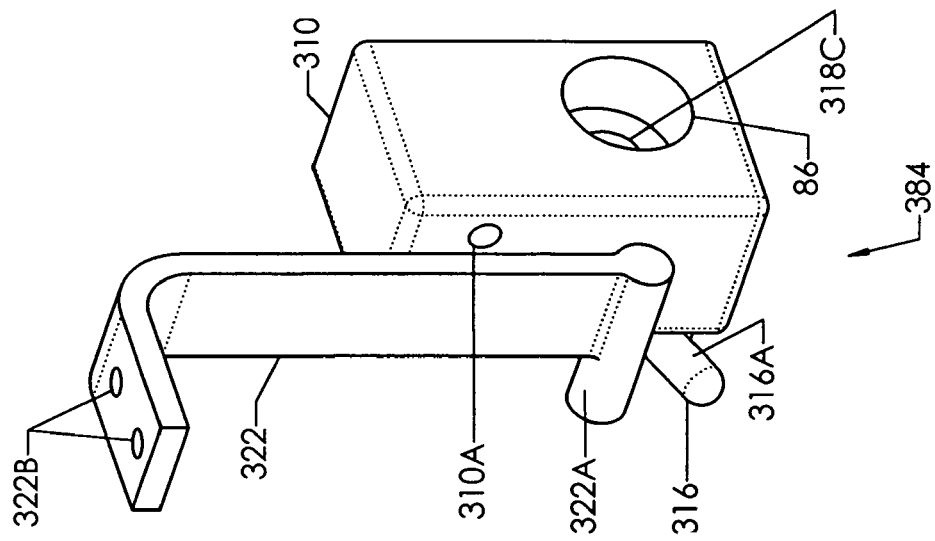
FIGURE 24C
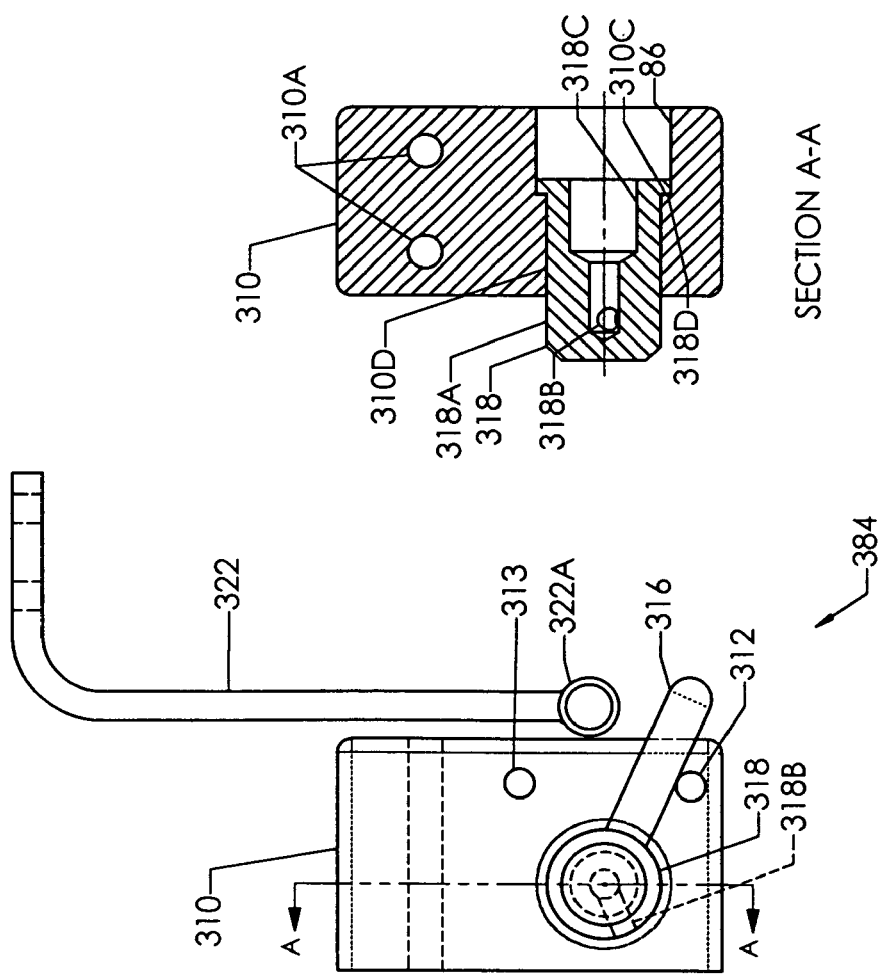
FIGURE 24B
FIGURE 24A

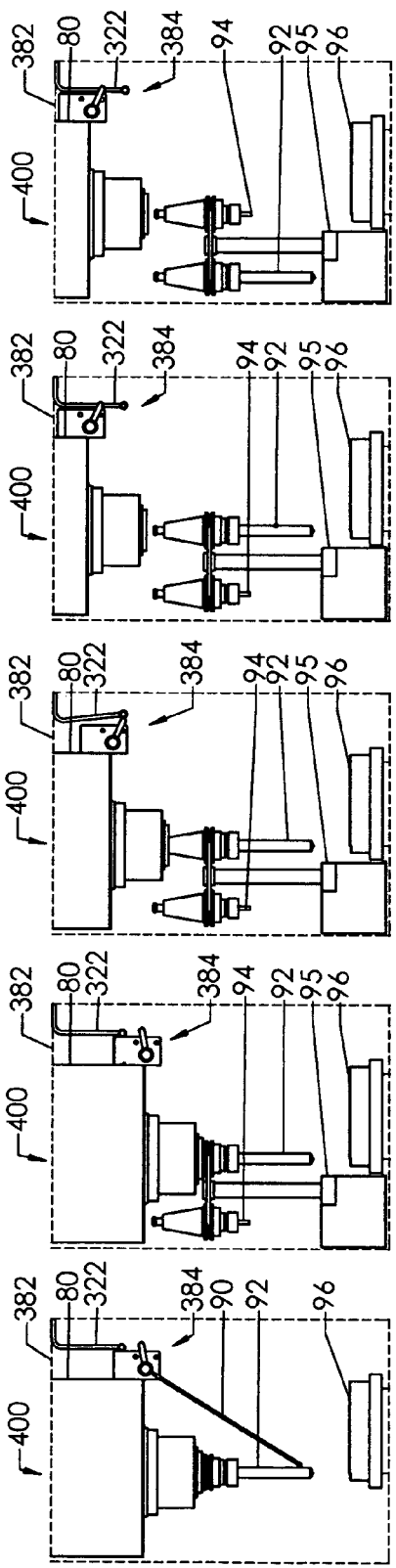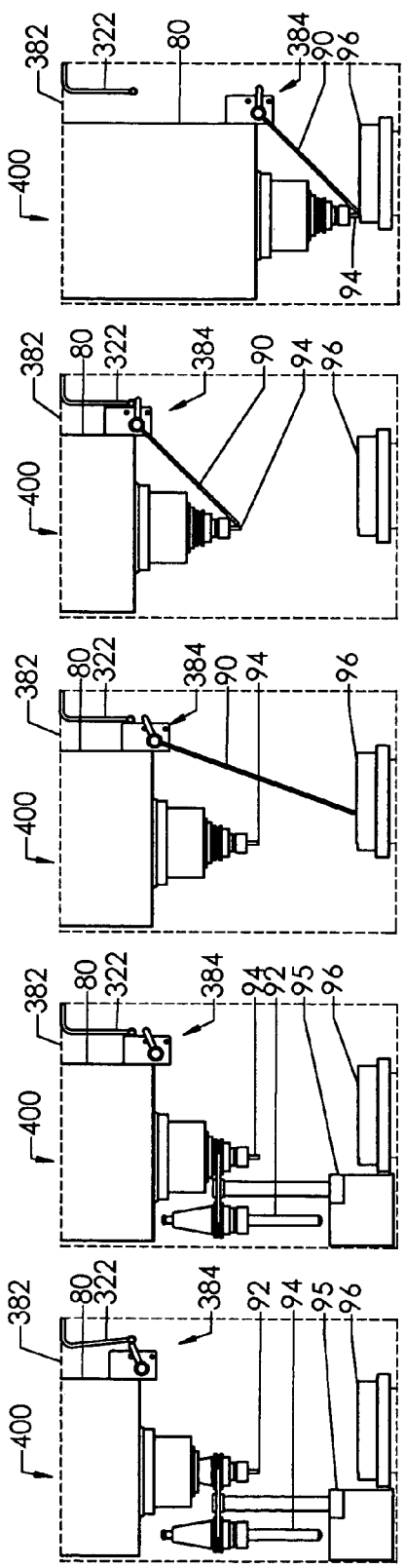

METHOD OF AUTOMATED COOLANT DELIVERY FOR A MACHINE TOOL

CROSS REFERENCE TO RELATED APPLICATION

This application claims the benefit of Provisional Ser. No. 60/282,541, filed 9 Apr., 2001 for AN AUTOMATED COOLANT DELIVERY SYSTEM FOR A MACHINE TOOL, by Gary Lee Curtis. This application is a divisional of patent application Ser. No. 10/118,678, filed 9 Apr., 2002 now U.S. Pat. No. 6,715,971 for AUTOMATED COOLANT DELIVERY METHOD AND SYSTEM FOR A MACHINE TOOL by Gary Lee Curtis, and incorporated by reference herein.

BACKGROUND AND FIELD OF INVENTION

The present invention relates to coolant delivery systems for machine tools, and more particularly relates to a novel and improved method and apparatus for automatically positioning a coolant nozzle for the delivery of coolant to the desired location on each of a plurality of different sized cutting tools, specifically to such delivery systems that allow automated control of coolant to a desired location in a machine tool.

In a computerized numerically controlled (CNC) machine tool, the various machining operations to produce a specific part are typically preprogrammed by an operator. The CNC machine tool performs operations, such as, drilling, tapping, and milling, automatically and without the intervention of the operator. In order to perform these operations, the CNC machine tool automatically changes cutting tools, from a drill, to a tap, to an end mill, for instance. During the cutting operations, it is desirable to direct the flow of a cooling fluid, or coolant, at or near the cutting interface. The coolant offers numerous benefits: (1) the coolant prevents the workpiece and tool from overheating, thus reducing scrap and tool costs; (2) the coolant provides a means of lubrication for the cutting tools; (3) the coolant minimizes thermal growth of the workpiece and the cutting tool that would otherwise reduce dimensional accuracy of the workpiece; and (4) the coolant carries away the material removed from the workpiece. When working with a metal workpiece, these chips of material become hardened in the cutting process. If these chips are not carried away, the cutting tool cuts these chips multiple times. Tool life decreases as a result.

When the machine tool changes cutting tools, the optimal position for the coolant stream changes. For example, the optimal coolant stream position for a long drill could be ten inches lower than the optimal coolant stream position for a short tap. Without an automated coolant delivery system, the operator must intervene when a tool is changed to optimize the coolant stream direction. The operator's intervention, to some extent, defeats the efficiency offered by the tool-changing capability of the CNC machine tool.

One prior art automated coolant system requires a motor to automatically position a coolant nozzle. The motorized coolant delivery system brings with it several disadvantages:

a) The cost of the motor increases the cost of the coolant delivery system substantially. The motor is a precise mechanism; cost reduction through high volume production is limited. The type of motor appropriate for this application requires additional electronic control hardware, which also drives the cost higher. Beyond the cost of the electronic control hardware, there is a cost associated with housing the additional electronic control hardware in a suitable environment. Also with motors, come electrical cables. Cable protection components, such as, shrouds and cable tracks are required to protect the cables from the environment surrounding the coolant delivery system. While some of the cable protection components can be shared with those provided for other electronic devices, often these protection components are already overcrowded. In addition, the distance from the electronic control hardware to the motor is often substantial. The cost of the cable, as well as the cost of labor required to install the cable, is significant.

b) Many machine tools have been installed in the field without an automated coolant delivery system. These machines need an easily retrofitted solution. Field installations exacerbate the problem of finding a place to install additional electronic control hardware and route associated electrical cables. Some of the electronic components in a machine tool are very expensive. The potential for damaging these components while installing a motorized coolant delivery system is significant. For this reason, highly skilled service technicians are required. Not only is more time required to install the additional electronic control hardware in the field, the time is more costly because the labor rates for skilled service technicians are quite high.

c) To realize the cost benefits of high volume manufacturing, a solution that works with many different models of machine tools with minimal customization, is desirable. The motorized coolant delivery system requires numerous variations to address the many various electrical control interfaces. This requirement defeats standardization efforts.

d) Software modification is required to implement the motorized coolant delivery system. Besides adding to the cost of implementation, this requirement also defeats standardization efforts.

e) Some of the manufacturers of the prior art motorized coolant delivery system have attempted to minimize cost by using a motor control system with coarse resolution. The coarse resolution results in non-optimal coolant stream settings and the operator is forced to choose a setting that is too high or too low.

As employed herein, the term "cutting tools" is intended to refer to any type of tool employed in the machining center or machine tool to carry out drilling, machining, shaping or grinding operations. Also, the term "coolant" is intended to refer to both liquid and gaseous cooling fluids.

SUMMARY OF THE INVENTION

It is an object of the present invention to provide a novel and improved automated coolant delivery system that eliminates the cost of a motor and the cost associated with its electronic control hardware and cables.

It is another object of the present invention to provide a novel and improved automated coolant delivery system that can be easily retrofitted by machine shop personnel.

It is a further object of the invention to provide an automated coolant delivery system that minimizes the need for custom components.

It is a still further object of the present invention to provide an automated coolant delivery system that requires no software modification.

Yet another object of the present invention is to provide an automated coolant delivery system that has adequate resolution to enable optimal coolant stream positioning.

In accordance with the present invention, in a coolant delivery apparatus for a machine tool in which each of a plurality of cutting tools are movable into cutting position with respect to a workpiece, the improvement comprising a source of coolant, a nozzle having a coolant inlet connected to the source, the nozzle being pivotally mounted in facing relation to each of the cutting tools when each one is advanced into cutting position so that the coolant stream is discharged from the nozzle to intersect a portion of the tool, and a mechanical actuator is provided to automatically adjust the angle of attack of the nozzle and its coolant stream with respect to each selected tool advanced into cutting position and in most cases to cause the coolant stream to intersect the interface between that tool and the workpiece. Preferably, the mechanical actuator is defined by a plunger assembly movable with the vertically movable head of the machine tool into engagement with a stop, and drive means is provided on the plunger for imparting pivotal movement to the nozzle a predetermined distance necessary to cause the coolant stream to intersect the cutting tool as described. It is also desirable that the nozzle be movable between a home or reference position and aiming position for each cutting tool then return to the home position as a preliminary to resetting for the next cutting tool in succession. Most desirably, the plunger assembly is also spring-loaded to compensate for excessive travel of the head.

A method in accordance with the present invention comprises the steps of providing a coolant to a nozzle, pivotally mounting the nozzle in facing relation to each of a plurality of cutting tools which are advanced into cutting position, and mechanically pivoting the nozzle to adjust the angle of attack of the cooling stream so as to cause it to intersect a portion of the cutting tool which is advanced into cutting position. In the method as described, a linear drive member is provided to pivot the nozzle, and the distance of travel of the linear drive member is correlated with the length of each cutting tool as the cutting tool is advanced into cutting position so as to automatically adjust the angle of attack of the coolant stream for that cutting tool and to releasably lock the nozzle in position as the cutting operation proceeds. Still another feature of the present invention is to return the nozzle to a reference position after each cutting operation as a preliminary to resetting the nozzle for the next cutting tool.

There has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 23A is an isometric view of an alternate form of invention;

FIG. 23B is an isometric view in more detail of the alternate form of invention shown in FIG. 23A;

FIG. 24A is an enlarged front elevational view of the alternate form of invention shown in FIG. 23A;

FIG. 24B is a side longitudinal section view of the alternate form of invention shown in FIG. 23A;

FIG. 24C is a rear isometric view of the alternate form of invention shown in FIG. 23A; and FIGS. 25A through 25J are elevational views of a lower portion of a machining center for the alternate form of invention shown in FIG. 23A, illustrating a nozzle aiming sequence.

DETAILED DESCRIPTION OF PREFERRED EMBODIMENT

Figure 1:
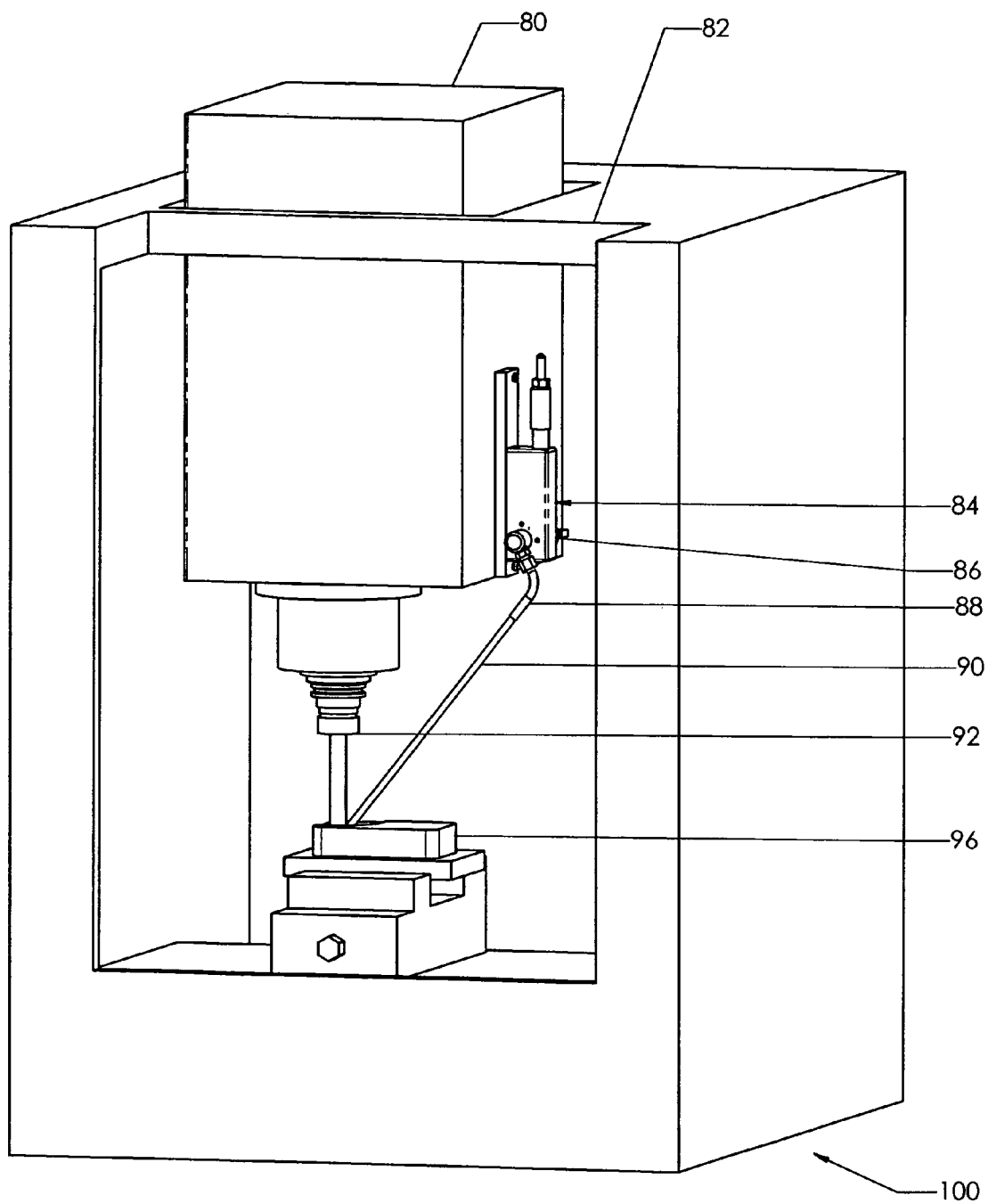
FIG. 1 is an isometric view of a machine tool having one preferred form of coolant delivery apparatus in accordance with the present invention.

Referring in detail to the drawings, there is illustrated in FIG. 1 an isometric view of one embodiment of an automated coolant delivery system 84 installed in a vertical machining center 100. The system 84 takes the form of a coolant delivery nozzle apparatus., and the vertical machining center is made up of a vertical head 80 having a cutting tool member 92 at its lower end; the head 80 being slidable vertically through a guideway in a top panel or stop 82 of an outer generally rectangular enclosure of the machining center 100. The machining center 100 may be one of any number of commercially available machining centers or machine tool systems which are provided with a coolant supply hose, not shown, which is connected to a coolant inlet 86 located at the rear of the nozzle apparatus 84. Coolant exits the nozzle apparatus 84 through a nozzle 88 and forms a coolant stream 90. The nozzle apparatus 84 is mounted near the bottom of head member 80 to permit unobstructed coolant access to tool 92. Nozzle apparatus 84 contacts the top panel or stop 82 when the head member 80 approaches the upper limit of its travel. The nozzle apparatus 84 is aligned fore and aft with respect to head member 80 to achieve the desired interaction between the coolant stream 90 and the tool 92. The panel 82 acts as a stop to limit upward movement of a plunger end 40 at the upper end of a plunger assembly in the apparatus 84.

Figure 2:
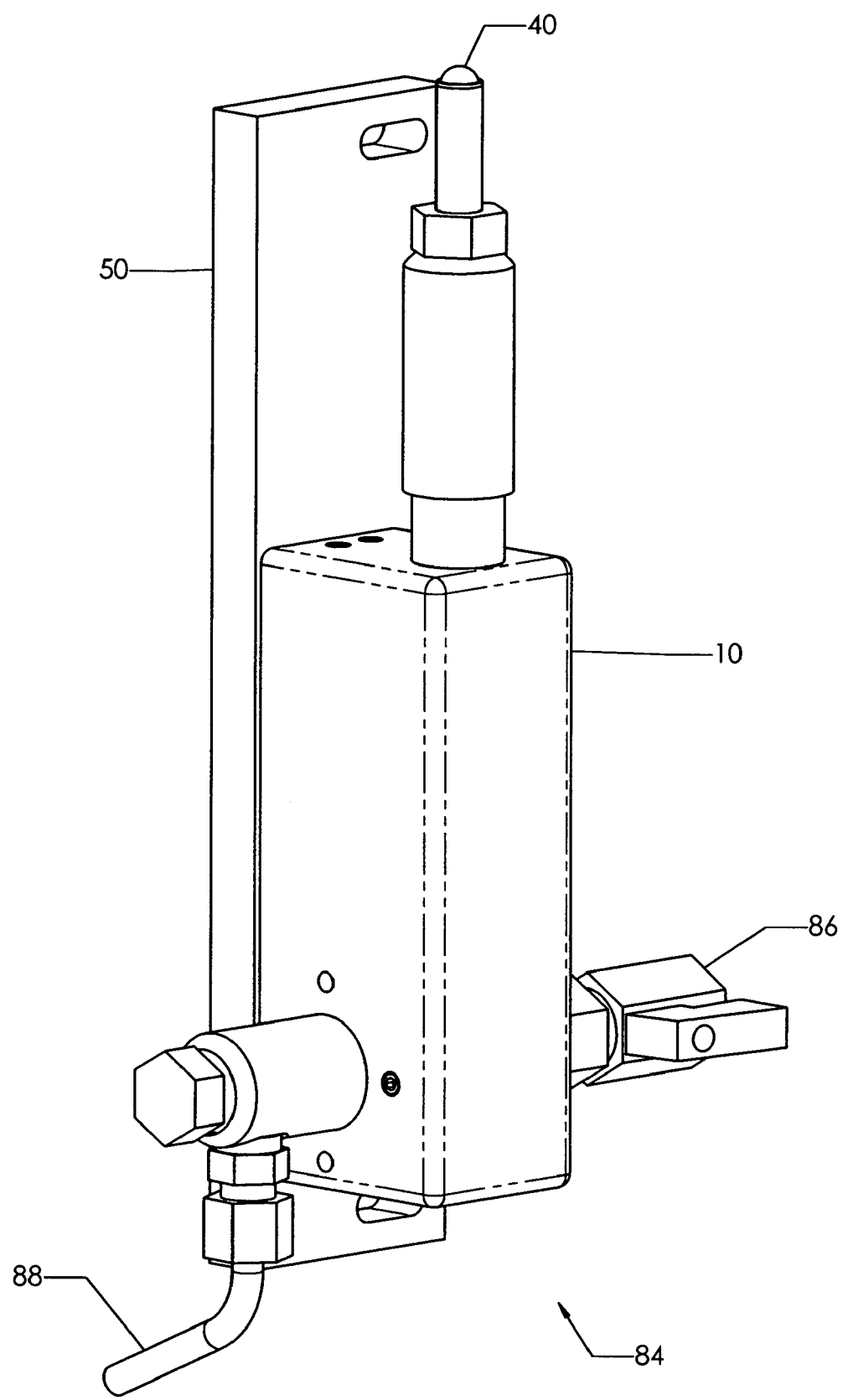
FIG. 2 is an isometric view in more detail of the form of apparatus shown in FIG. 1.

FIG. 2 is an isometric view of the coolant delivery nozzle apparatus 84 showing key external features. A base or mounting plate 50 provides two slots for screw-type fasteners that mount the nozzle apparatus 84 to head member 80. The base 50 is connected also to a housing 10 using screw-type fasteners.

The nozzle apparatus 84 is actuated by moving the head member 80 relative to the stop 82 until the plunger end 40 contacts the stop 82; continued advancement causes the bumper or plunger end 40 to impart a downward force thereby rotating nozzle 88 clockwise. With the coolant supply turned on, a machine operator aims the coolant stream 90 at a desired position on the tool 92 by moving the head member 80 up until the nozzle 88 is rotated to direct the coolant stream 90 to the desired position. The apparatus 84 can be calibrated in various ways to correlate the distance of vertical movement of the head 80 necessary to rotate the nozzle 88 to direct the coolant stream at the lower tip of each tool member. As will become hereinafter more apparent from a consideration of FIGS. 3 to 10, assuming that a plurality of tool members, such as, the member 92 are successively advanced into operative position in the machining center 100, the distance of vertical movement of the head 80 will vary in inverse relation to the length of the tool member 92. For example, the longer the tool member 92, the lesser the distance of travel of the head 80 required from a nozzle home or reference position to rotate the nozzle 88 to the desired position. Stated another way, by reference to FIG. 2, the degree of retraction of the plunger end 40 decreases with increases in length of the tool 92. Assuming that a plurality of tool members 92 are arranged in a particular order for advancement into operative position on the machining center 100, such as, by mounting on a conventional feed turret for the machining center, the distance of vertical movement of the head 80, or retraction of the plunger end 40, can be calibrated or programmed according to the length of each tool and its location on the machining center.

By way of illustration, the operator may program the machine to automatically aim the coolant stream 90 by inserting a command into a suitable machining program on the machining center 100 to move the head member 80 up to the previously determined position required to properly set the desired coolant stream position. This nozzle setting is correlated with each tool 92 by inserting the move command in the program following the command that changes to that tool 92. Other nozzle settings for other tools can be programmed in the same manner. The nozzle programming method discussed above, wherein the machine operator determines the coolant nozzle setting visually, typically yields the optimal coolant stream setting. The head position for setting the nozzle can also be calculated using tool values such as diameter and length. These tool values are typically stored in memory for part programming purposes. This nozzle programming method requires less time than the method discussed above, but often the optimal coolant stream setting for each tool differs from the mathematically calculated setting. One satisfactory solution is to use the mathematically calculated setting for tools where the coolant setting is not critical, and use the visual nozzle setting method when the coolant setting is critical.

Figure 3:
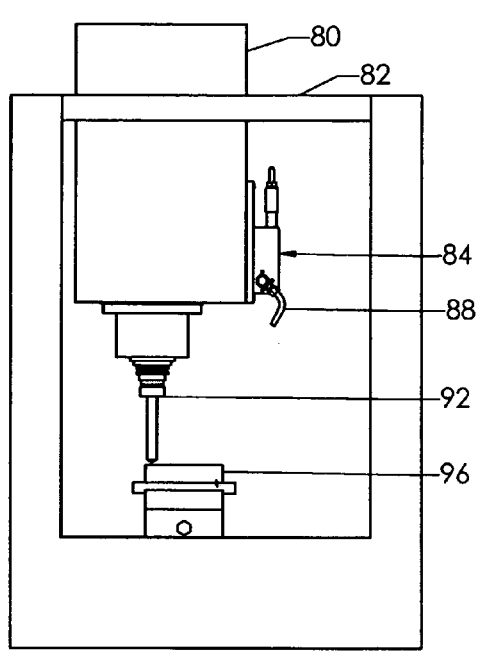
FIG. 3 is an elevational view of the preferred form of invention showing the nozzle apparatus in its home position.

FIGS. 3 through 10 illustrate sequential steps involved in directing coolant to two cutting tools of different length in a typical vertical machining center 100. In FIG. 3, a tool 92 is shown in the loaded position at the lower end of the head member 80, and the nozzle apparatus 84 is illustrated in its home or neutral position. In order to set the proper angle of the nozzle 88 for directing a coolant stream 90 to the lower tip of the tool 92, the head 80 is raised a distance correlated with the tool 92 so as to urge the plunger end 40 against the panel 82. Retraction of the plunger end 40 in a linear or axial direction will in a manner to be described impart rotational movement to the nozzle 88 until the coolant stream 90 is at the proper angle or attitude as illustrated. The head 80 will discontinue its upward movement and the nozzle will be temporarily fixed at the angle set by retraction of the plunger. The coolant supply from the machining center 100 is activated so that coolant flows through nozzle 88 to produce the coolant stream 90.

Figure 5:
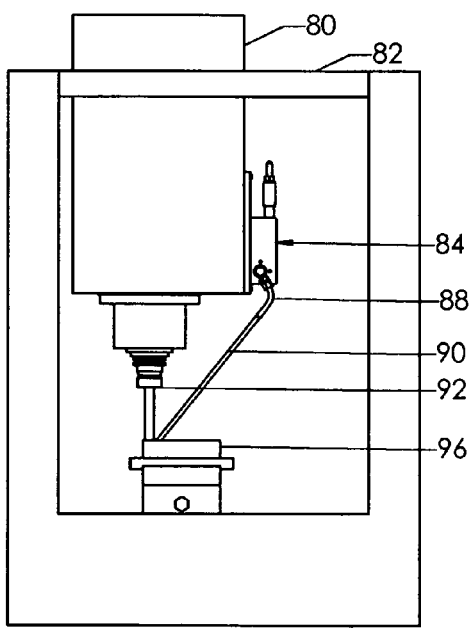
FIG. 5 is an elevational view of the preferred form of invention showing movement of the cutting tool downwardly into engagement with a workpiece.
Figure 6:
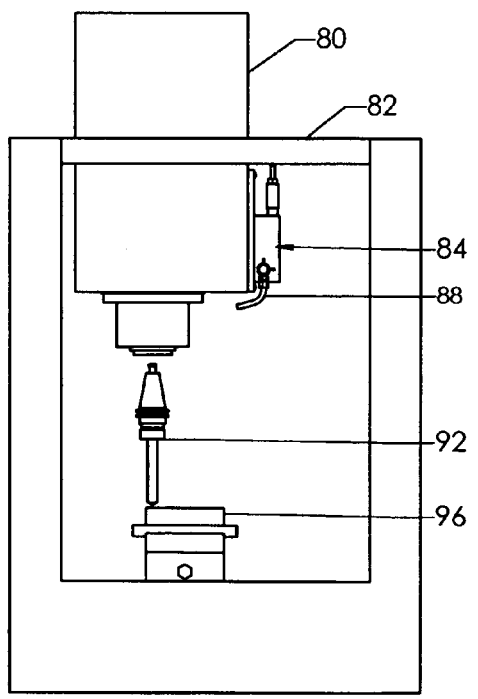
FIG. 6 is an elevational view of the preferred form of invention showing return of the nozzle to its clockwise limit, the first cutting tool being shown extracted from the head.

As shown in FIG. 5, when the head 80 is lowered until the tool 92 moves into engagement with a workpiece 96, the nozzle 88 will remain locked in position to accurately direct the coolant stream 90 at the interface between the lower tip of the tool 92 and the workpiece 96. Once the machining operation is completed for the workpiece 96, the head 80 is returned to its clockwise limit position, as shown in FIG. 6. If it is necessary to change the tool 92, as further illustrated in FIG. 6, the head 80 is raised to its highest position and the first tool 92 is released.

Figure 7:
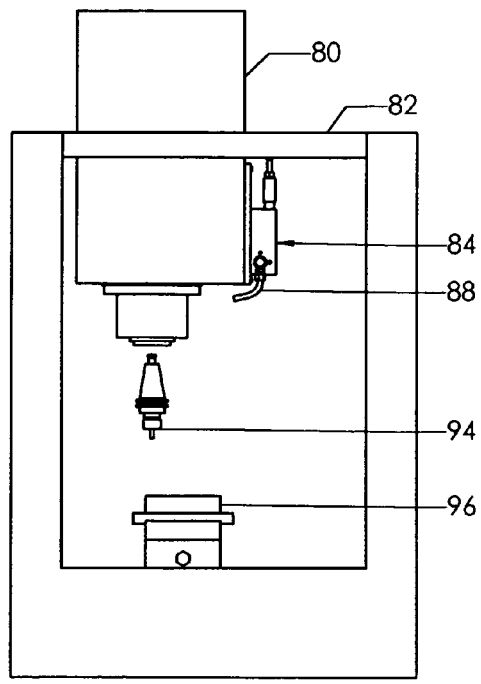
FIG. 7 is an elevational view of the preferred form of invention showing the second tool in position to be loaded.
Figure 8:
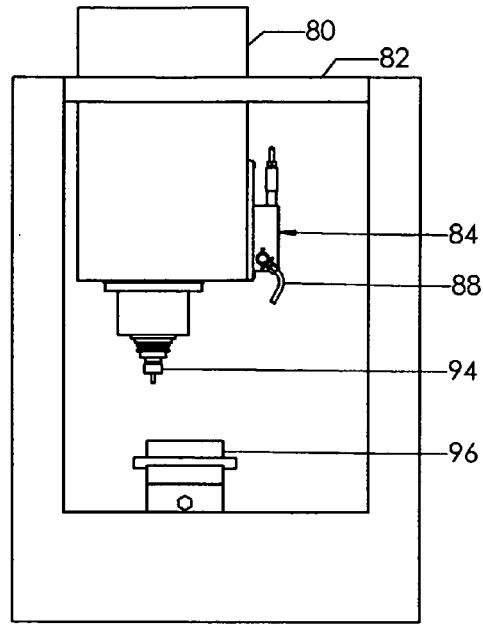
FIG. 8 is an elevational view of the preferred form of invention showing return movement of the nozzle to its home position.

FIG. 7 illustrates another cutting tool 94 moved into position to be loaded into the head 80. Typically, this is done with the aid of a conventional tool-changing turret or other device which holds a number of tools and will rotate each selected tool, such as, a short tool 94, into position as shown in FIG. 7. Referring to FIG. 8, the head 80 is moved down to accept the tool 94, and the nozzle apparatus 84 will have returned to its home position. The coolant supply from the machining center 100 is activated so that coolant flows through nozzle 88 to produce the coolant stream 90.

In FIG. 9, the head 80 once again is advanced upwardly to cause the plunger end 40 to move into engagement with the stop 82. The degree of retraction of the plunger end 40 is that necessary to cause the nozzle 88 to pivot or rotate to a position such that the coolant stream 90 is directed at the lower tip of the tool 94 or a portion of the tool in proximity to its tip. The head 80 is then lowered as shown in FIG. 10 to cause the tool 94 to move down to the workpiece 96. The nozzle 88 will remain fixed or locked in the rotational position established by the plunger so as to continue to direct the coolant stream 90 at the lower tip of the tool 94.

In FIG. 10, the head member 80 moves down to workpiece 96 with the tool 94. The nozzle apparatus 84 no longer contacts the stop 82. The nozzle apparatus 84 maintains its position such that nozzle 88 continues to direct the coolant stream 90 toward the tip of the short tool 94.

Figure 4:
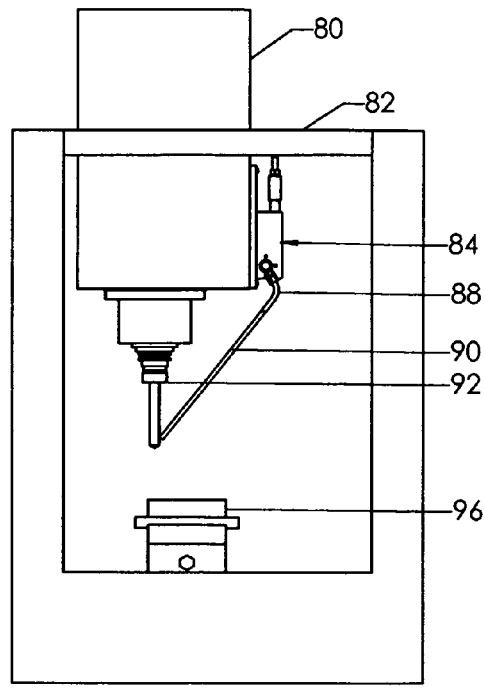
FIG. 4 is an elevational view of the preferred form of invention showing the nozzle apparatus in a raised position setting the nozzle at a desired angle to direct coolant to the lower tip of a cutting tool.
Figure 9:
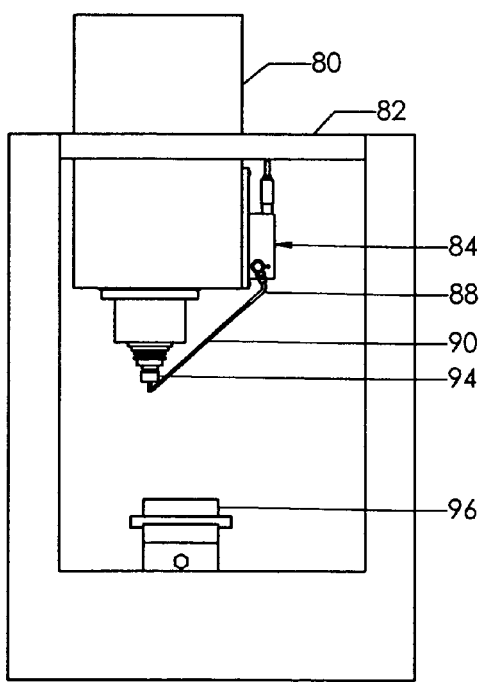
FIG. 9 is an elevational view of the preferred form of invention showing setting of the nozzle at a desired angle to direct coolant to the desired location on the second cutting tool member.
Figure 10:
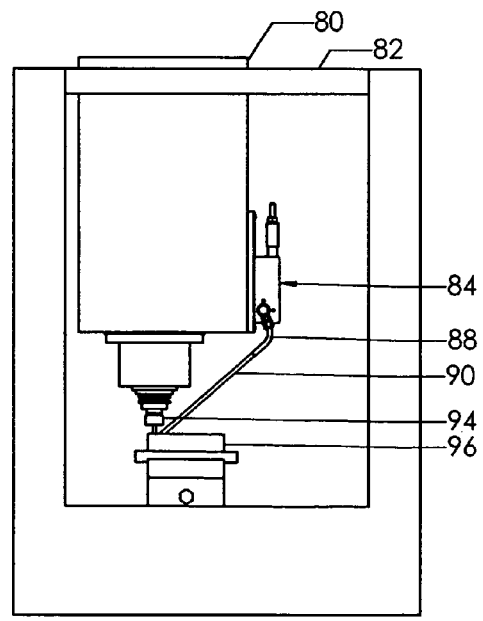
FIG. 10 is an elevational view of the preferred form of invention showing downward movement of the cutting tool into engagement with a workpiece.

The sequence discussed in FIGS. 3 through 10 describes a nozzle-aiming sequence for a typical vertical machining center. While eight illustrations (FIGS. 3 through 10 above) were used to describe the sequential steps involved in directing coolant to two tools of different length, in this application only one head position per tool is required to set the coolant direction. FIG. 4 shows the head position required for directing coolant to the tool 92. FIG. 9 shows the additional head position required for directing coolant to the short tool 94. FIGS. 3, 5, 6, 7, 8 and 10 show positions of head 80 that are required in the tool-changing sequence. Utilization of the tool-changing head positions results in optimized efficiency for this method of directing coolant.

In some vertical machining center applications, the tool-changers have an additional axis that moves the tool 94 upward into the head 80. The head 80 stays in the position shown in FIG. 7 as the tool 94 is moved upward by the tool-changer. In these applications, the position described in FIG. 8 is an additional position not required for changing tools. These applications therefore require two additional head positions to aim the nozzle apparatus 84. The first additional position, shown in FIG. 8, allows the nozzle to return to its home position. The second additional position, shown in FIG. 9, aims the coolant stream 90 at the short tool 94.

In all applications, the nozzle apparatus 84 will advance through three positions to complete a nozzle setting cycle. The first nozzle apparatus position, as shown in FIGS. 6 and 7, is used to initiate the nozzle apparatus homing step. The second nozzle apparatus position, as shown in FIG. 8, completes the nozzle apparatus homing step. The third position, as shown in FIG. 9, aims the coolant stream 90. The typical vertical machining center application described in FIGS. 3 through 10 utilizes two tool-changing positions plus one additional nozzle-aiming position to aim the nozzle apparatus 84. The vertical machining center application discussed in the previous paragraph utilizes one tool-changing position plus two additional nozzle apparatus positions to aim the nozzle apparatus 84. Another application, a lathe for instance, might utilize no tool-changing positions and three additional apparatus positions to aim the nozzle apparatus 84.

While the complete nozzle setting cycle discussed above is typically used to aim the nozzle apparatus 84, sometimes a partial nozzle-setting cycle is used to move the coolant stream 90 higher on the tool as the tool cuts deeper into the workpiece. This partial nozzle-setting cycle is easily accomplished by inserting another move command in the program to move the head member 80 to a position above the original nozzle-setting position. The cutting operation is interrupted at a partial depth, the partial nozzle-setting cycle is executed to aim the nozzle higher on the tool, then the cutting operation resumes.

Figure 11:
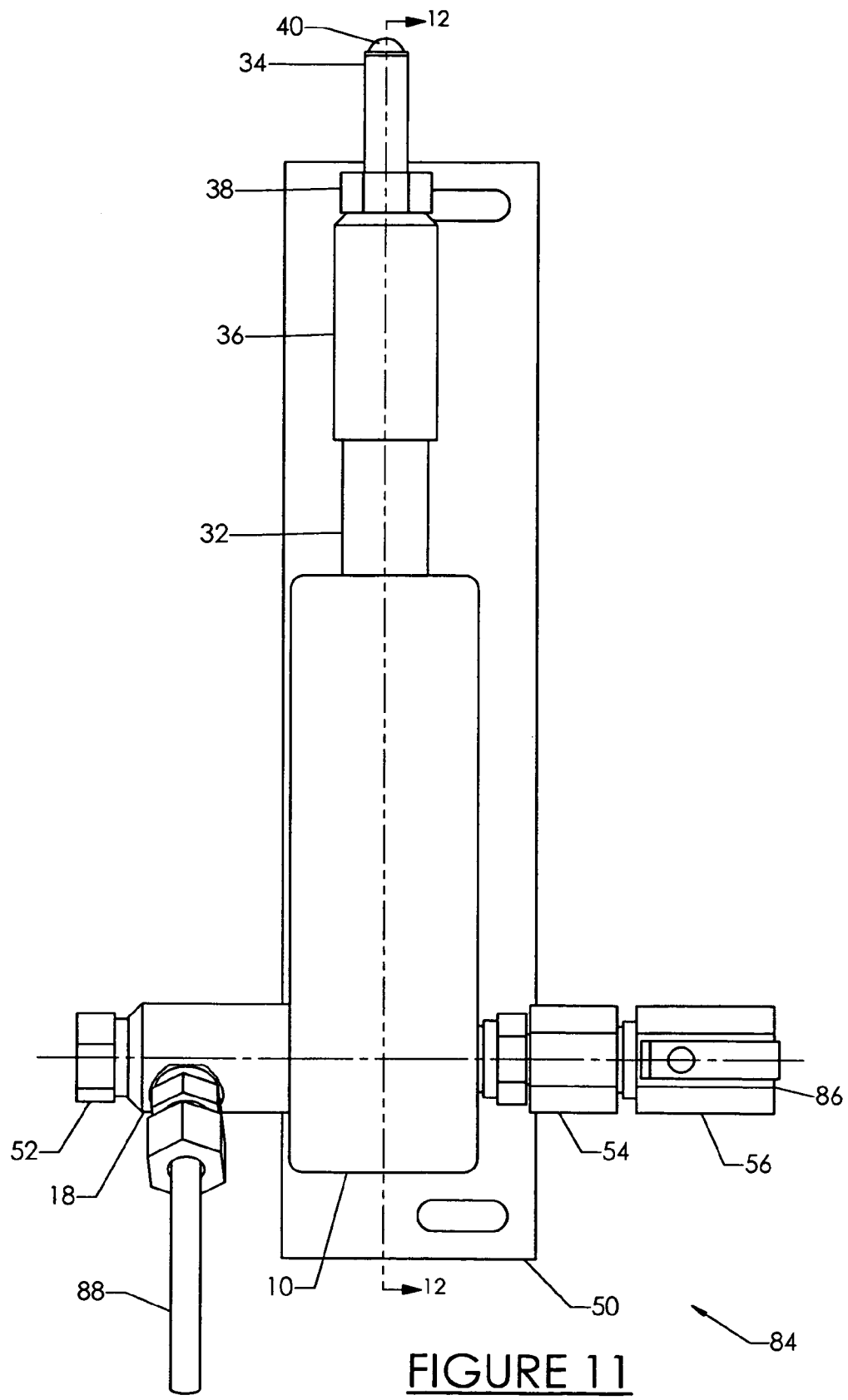
FIG. 11 is an enlarged side elevational view of the preferred form of nozzle apparatus.

FIGS. 11 to 16 illustrate one form of nozzle apparatus 84 in more detail. Referring to FIG. 11, a hollow shaft 18 projects laterally from a lower end of the housing 10 and is closed at its outer free end by a suitable plug 52. The shaft 18 extends transversely through the housing and is provided with a swivel fitting 54 at its opposite end. A port 86 including a suitable on-off valve 56 is connected to the end of the swivel 54. The swivel 54 provides a rotating fluid union so that the shaft 18 is free to rotate with respect to the coolant port 86 and connecting hose for the coolant which is connected into that port 86.

The swivel 54 and valve 56 are conventional components and, for example, the valve 56 may be a Model 76-102-01 manufactured and sold by Conbraco, Apollo Valve Division of Pageland, S.C. and swivel 54 may be a Model No. 30.153 manufactured and sold by Mosmatic Corp., Briston, Wis. Of course, the valve 56 allows the machine operator to modulate or shut off the coolant stream to the nozzle apparatus 84.

An important feature of the present invention resides in the manner in which the nozzle 88 is advanced to a different aiming position for each different tool.

Broadly, as hereinafter described in relation to FIGS. 12 to 16, the nozzle is capable of advancing between a home or reference position and aiming position, but will always return to the home position as a preliminary to advancing to the next aiming position for the next tool in succession. The numbers or values representing the distance required to advance the nozzle between positions may be encoded into any of the various standard computer programs used to create part-machining programs and employed in any one of the known vertical machining centers, such as, the Model VMC 4020 manufactured and sold by Fanuc Machining Centers, Chatsworth, Calif.

Figure 12B:
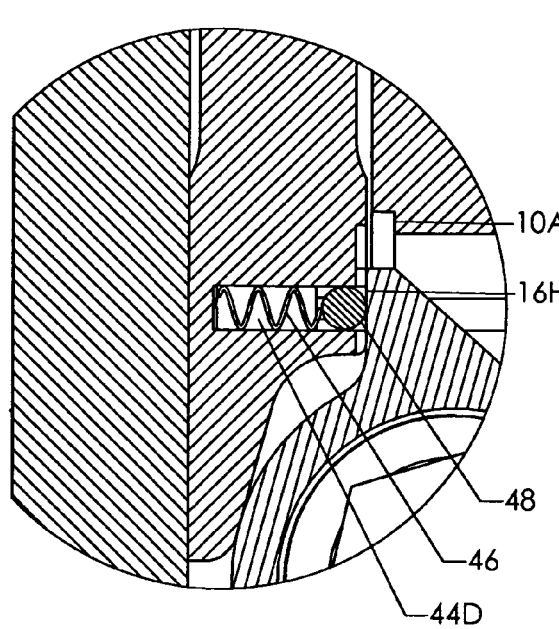
FIG. 12B is an enlarged sectional view of detail B of FIG. 12.
Figure 12A:
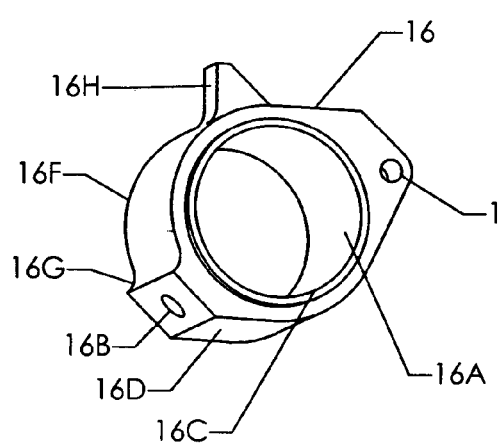
FIG. 12A is an enlarged isometric view of the crank.
Figure 12:
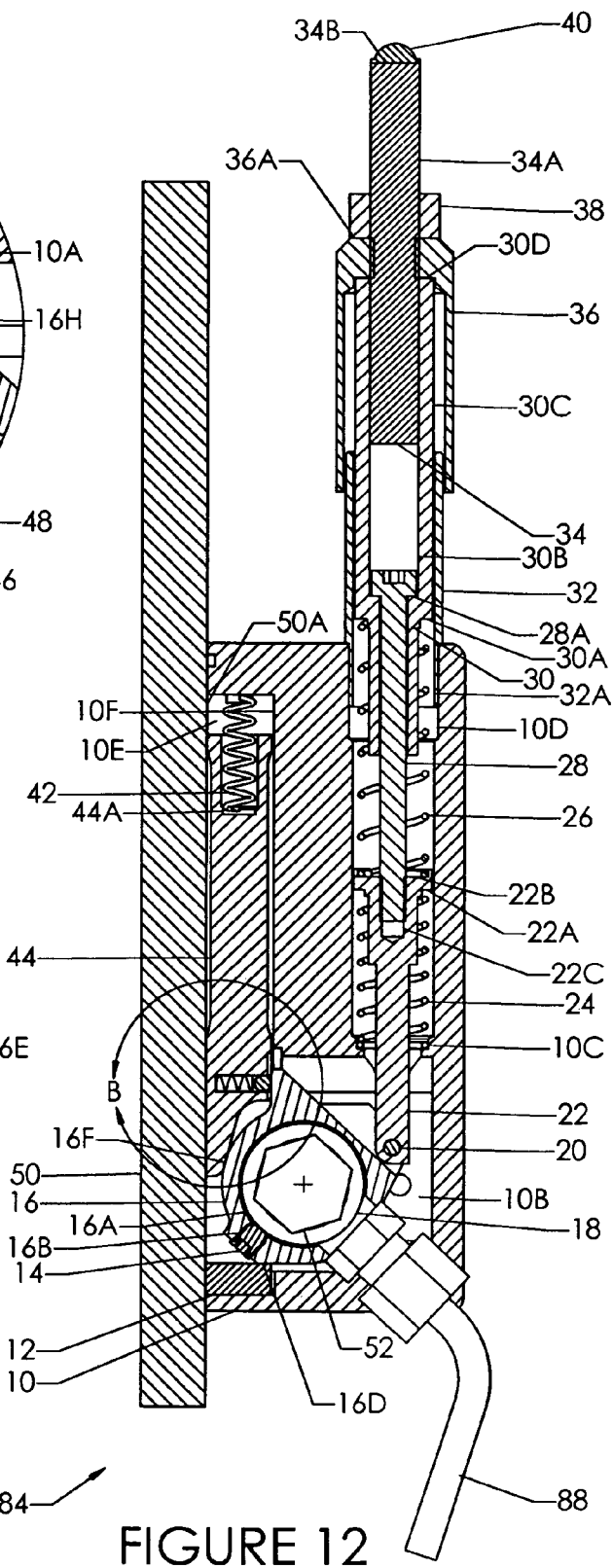
FIG. 12 is a front longitudinal section view taken about lines 12—12 of FIG. 11 with the nozzle apparatus shown in its home position.

FIG. 12 is a sectional view of the nozzle apparatus 84 in its home position as previously illustrated in FIGS. 3 and 8. The nozzle 88 is affixed adjacent to one end of the shaft 18, and a generally annular crank 16 is affixed in surrounding relation to the shaft 18 intermediately between opposite side walls of the housing 10, the nozzle 88 extending downwardly from shaft 18 to one side of and beneath the bottom wall of the housing 10. The outer cylindrical surface of the shaft 18 pivots in bearing bores in the housing 10, and the nozzle 88 threads into a radial opening or port in the hollow wall of the shaft 18 so as to channel the coolant into a desired coolant stream profile. The set screw 14 threads into a threaded hole 16B in the crank 16 to prevent rotational and axial movement of the crank 16 with respect to the shaft 18, and inner circular wall 16A of the crank 16 fits snugly on the outside diameter of the shaft 18. The crank 16 includes thrust bearing surfaces 16C that contact lower cavity walls 10B in the housing 10 to fix the shaft 18 against axial movement. When the connecting pin 20 raises the nozzle 88, a limit stop member 12 in the bottom wall of the housing will limit further counterclockwise rotation of the shaft 18 by contacting a flat surface 16D on the crank 16. Here, the upward vertical force is applied by a crank pin 20 to a bore 16E in the crank 16 to produce a counterclockwise moment about the crank 16 under the urging of the compressed crank spring 24 acting upwardly on the upper end of the rod 22. The lower end of the spring 24 is seated in a spring bore 10C in the housing 10, and the upper end of the spring 24 is seated against a flange 22A on the connecting rod 22 in urging the connecting rod 22 upwardly.

As shown in more detail in FIG. 12B, a latch pin 48 is disposed in a slot 44D directly above the lower tapered end of the block 44 and is normally urged by one or more compression springs 46 in a direction away from the base 50 and against an abutment 16H on the crank 16 for a purpose to be hereinafter described in more detail with reference to FIG. 15.

As further shown in FIGS. 12 to 16, the pivotal movement of nozzle 88 is regulated by a plunger assembly which includes the connecting rod 22 at the lower end of the assembly and which is mounted in a bore 10D extending vertically through the greater length of the housing 10 and terminates in a lower cavity 10B which receives the shaft 18. An overtravel function is provided in the plunger assembly by compression spring 26 disposed in surrounding relation to a screw 28. The upper end of the screw 28 includes an enlarged head 28A seated in the bottom of a bore 30B in an elongated hollow piston 30, and the upper end of the spring 26 bears against lower end surface 30A of the piston 30 with the screw 28 extending downwardly through a bore in the piston 30. The spring 26 also bears against end surface 22B of the rod 22 so as to provide an opposing force to the opposite, lower end of the screw 28 which is threaded into the threaded hole 22C in the top of the connecting rod 22. Outer surface 30C of the piston 30 is slidable through the lower end 32A of a guide tube 32 which is pressfit into upper end 10D of the main plunger passageway.

The threaded bore 30B within the piston 30 receives and threadedly engages an outside threaded surface portion 34A of a plunger 34. The piston is surmounted by an end cap or shield 36 which threads onto the plunger 34 and rests on a top surface 30E of the piston 30. A jam nut 38 is threaded onto the plunger 34 until it bears against upper surface 36A, and the plunger end 40 is affixed using adhesive to the terminal end surface 3GB of the plunger 34. The plunger end 40 is suitably composed of an elastomeric material which will minimize the noise produced when the plunger end 40 contacts the upper panel 82 of the machine center. The end cap 36 includes a downwardly extending skirt in surrounding relation to the upper end of the cylinder 32 and operates to keep foreign matter out of the plunger assembly as well as the entire apparatus. The plunger 34 is used to calibrate the nozzle apparatus by threaded adjustment through the piston 30 and then being locked in position by the jam nut 38. Thus, when the housing 10 is mounted on the sidewall of the head 80 and the head 80 is moved to the highest possible position in its normal operating range, the plunger 34 is adjusted upwardly by threading it with respect to the shield 36 until the nozzle 84 is advanced to the clockwise limit position shown in FIG. 14. The jam nut 38 is then tightened against the shield 36 to lock the plunger 34 in place.

Figures 13, 13B:
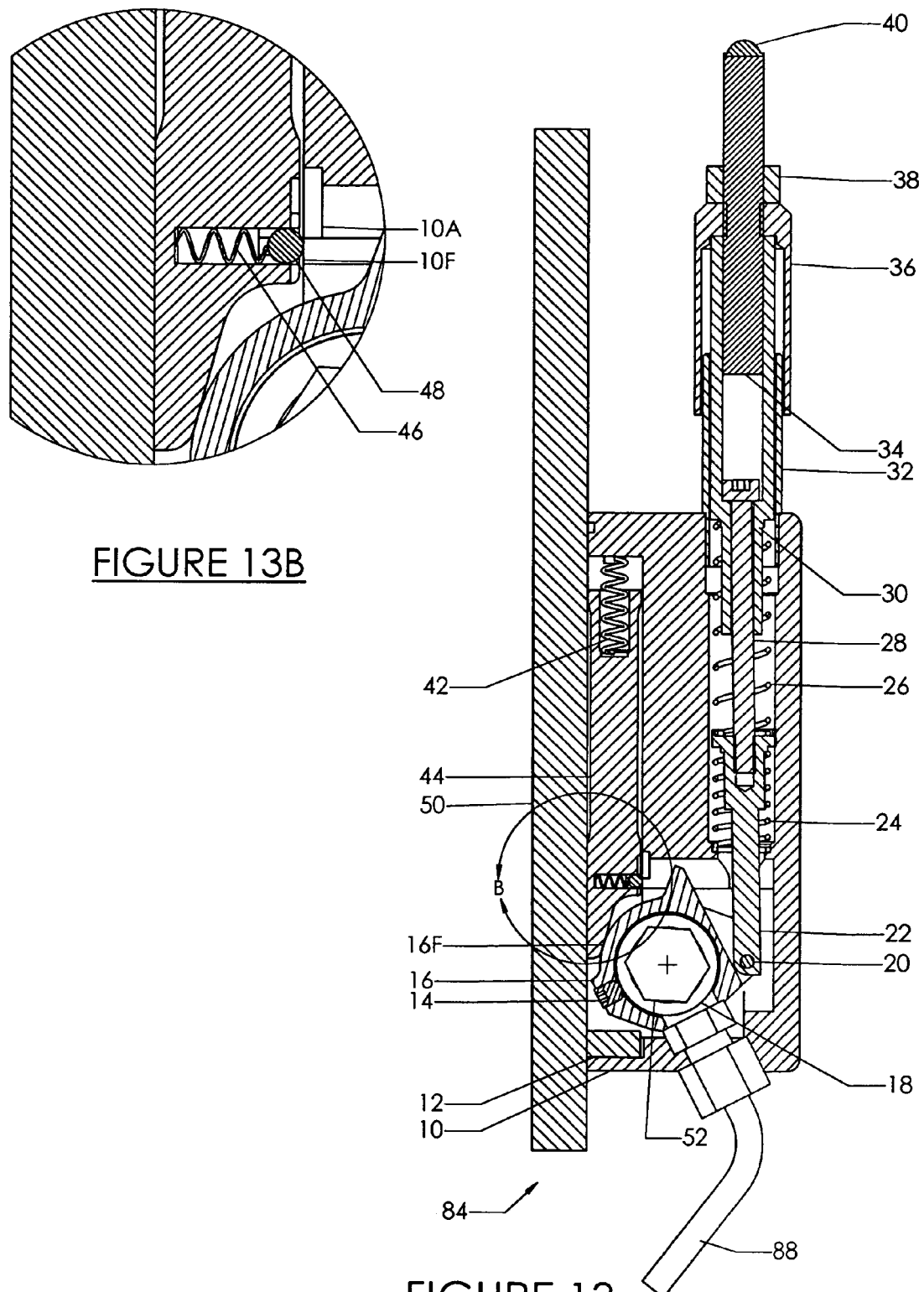
FIG. 13 is a front longitudinal sectional view of the preferred form of apparatus in its locking or holding position.
FIG. 13B is an enlarged sectional view of detail B in FIG. 13.

Referring to FIGS. 13 and 13B, the head 80 in moving upward will cause the plunger end 40 to rotate the nozzle 88 clockwise, but the block 44 will remain in locking position under the urging of the spring 42. In this way, as the head 80 moves downwardly along with the nozzle apparatus 84, the nozzle 88 will remain in the adjusted position to direct the coolant stream 90 against the lower tip of the tool 92 as it engages the workpiece 96. Thus the braking and locking function of the member 44 maintains the position of the nozzle 88 once the direction of the coolant stream 90 has been established. When the head 80 is raised a distance correlated with the next desired nozzle setting, the plunger 34 will drive the crank in a clockwise direction, overcoming the frictional force of the block 44; and, as the plunger 34 moves away from the upper stop 82, the downward urging of the spring 42 will maintain sufficient frictional force of the block 44 against the crank 16 to counterbalance the upward urging or spring pressure of the spring 24.

Figure 14B:
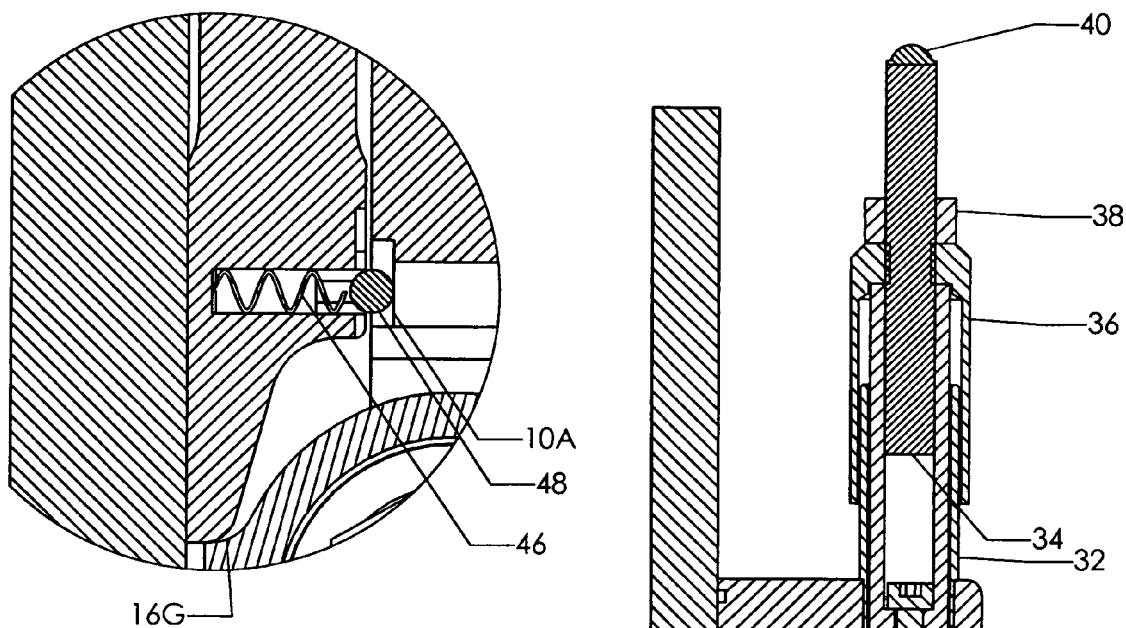
FIG. 14B is an enlarged sectional view of detail B shown in FIG. 14.
Figure 14:
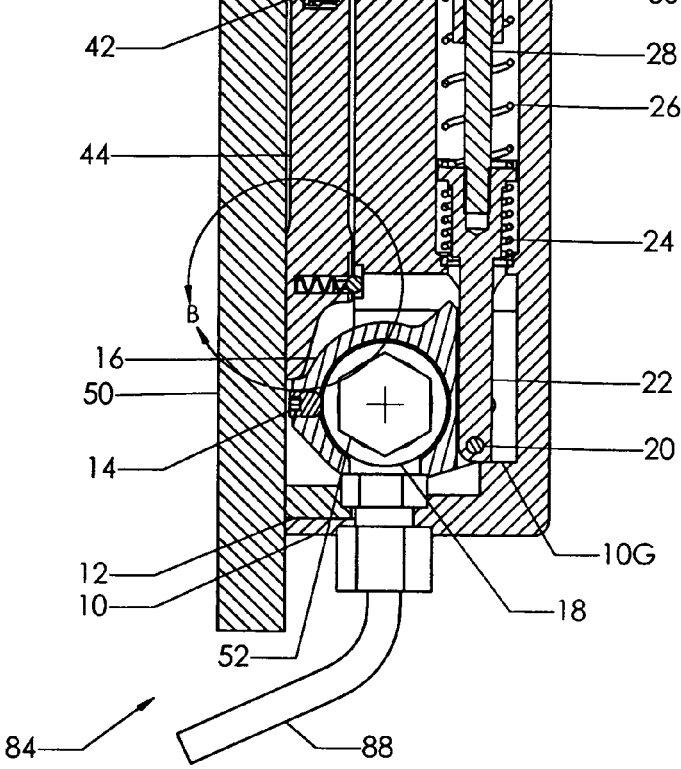
FIG. 14 is a front longitudinal sectional view of the preferred form of apparatus in its clockwise limit position.

FIG. 14 is another sectional view of the nozzle apparatus 84 in its clockwise limit position after the head 80 has moved upwardly, as shown in FIG. 6, and the block 44 has moved away from locking engagement with the crank 16, and the plunger end 40 has rotated the nozzle 88 clockwise to its clockwise limit position in preparation for returning the nozzle apparatus 84 to its home position. In this position, the connecting rod 22 contacts a horizontal stop 10G on the housing 10 so as to prevent additional rotation of the crank 16. In this position, the latch spring 46 urges the pin 48 into the notch 10A in the housing 10, as best seen from FIG. 14B. Before the nozzle can be advanced to another aiming position, it must be returned to the home position of FIG. 12 so as to enable the block 44 to slide back into frictional engagement with the crank 16.

Figure 15B:
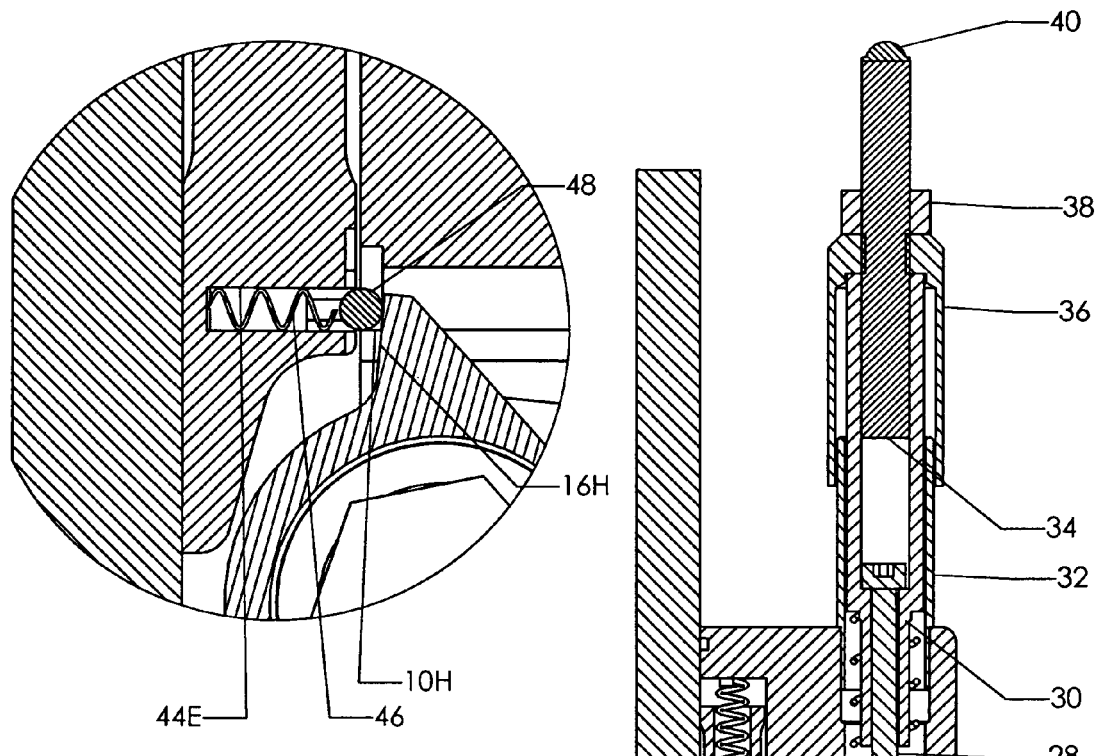
FIG. 15B is an enlarged sectional view of detail B shown in FIG. 15.
Figure 15:
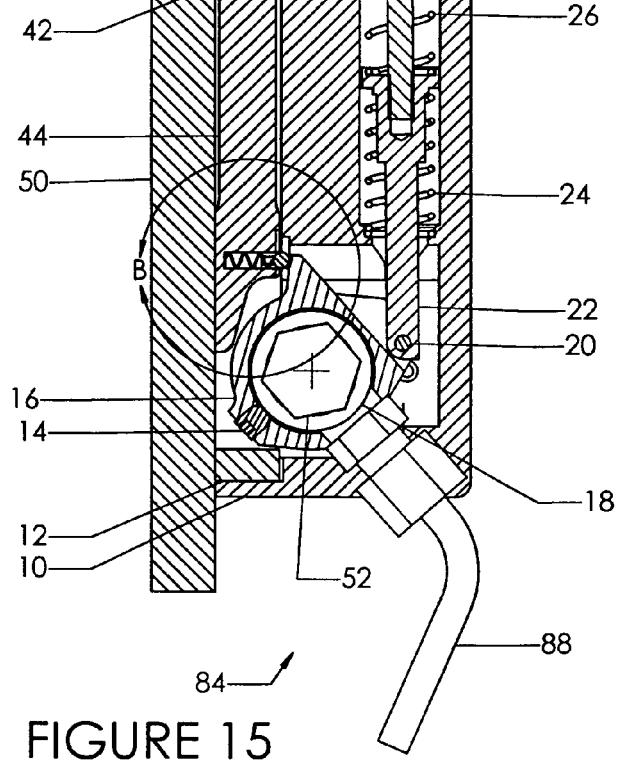
FIG. 15 is a front longitudinal sectional view of the preferred form of apparatus in a position between clockwise limit and home.

FIGS. 15 and 15B illustrate in more detail the transitional movement which occurs between the clockwise limit position, FIG. 14, and the home position, FIG. 12. The latch pin 48 engages the notch 10A, and the spring 42 urges the block 44 downwardly whereupon the slot surface 44E in the block 44 will urge the pin 48 downwardly. This downward vertical force is transmitted to a horizontal notched surface 10H in the housing 10 to prevent the block 44 from applying tangential frictional force to the crank 16. The unopposed upward vertical force applied by the pin 20 results in a counterclockwise moment which urges the crank 16 toward the home position shown in FIG. 12. In the home position, the latch release 16H will retract the pin 48, as shown in FIG. 12, and the block 44 is then free to slide downwardly to frictionally engage the crank 16.

Figure 16B:
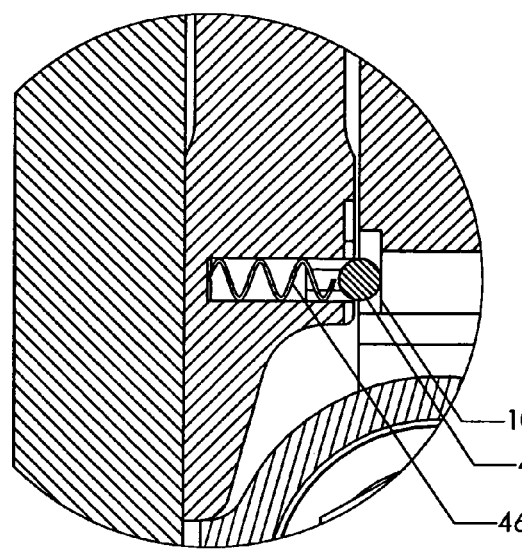
FIG. 16B is an enlarged sectional view of detail B in FIG. 16.
Figure 16:
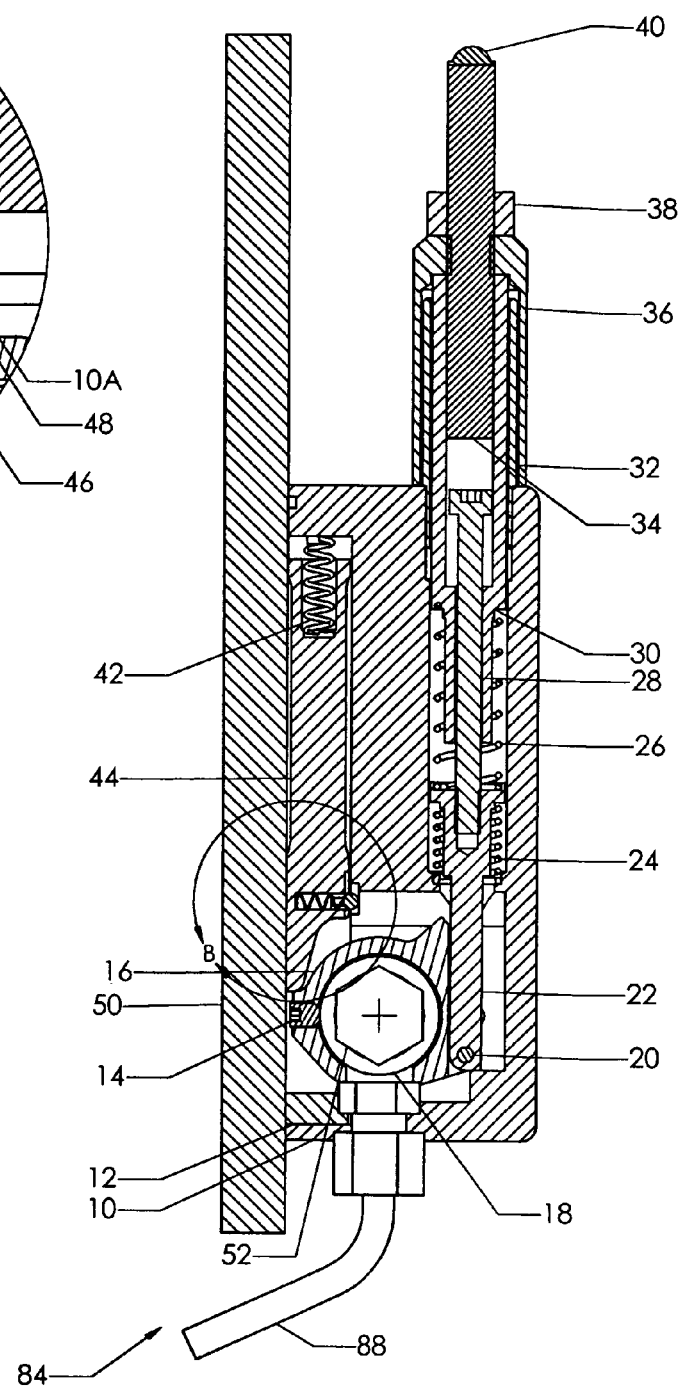
FIG. 16 is a front longitudinal sectional view of a preferred form of apparatus in its overtravel position.

A fail-safe feature is provided in order to prevent damage to the machining center and nozzle apparatus in the event of accidental overtravel of the plunger beyond a programmed limit. FIG. 16 is a sectional view of the nozzle apparatus 84 in its overtravel position as previously discussed in connection with FIG. 12 but illustrating the compression of the spring 26 thereby permitting overtravel of the piston 30, the shield 36, the jam nut 38, plunger 34 and the plunger end 40. The lower end of the overtravel spring 26 bears against the top of connecting rod 22. The upper end of overtravel spring 26 seats against a spring base 30A of overtravel piston 30. The overtravel screw 28 threads into a threaded screw hole 22C in the top of connecting rod 22. A lower head surface 28A of the overtravel screw 28 stands above the bottom of a screw bore 30B in overtravel piston 30, permitting compression of overtravel spring 26. The cylindrical outside surface 30C of overtravel piston 30 slides in a guide bore 32A in a guide cylinder 32. The guide cylinder 32 presses into a cylinder bore 10C in housing 10.

Again, the overtravel function accommodates excess travel of the head member 80 that might occur if the head member 80 is moved beyond its normal operating range. The force provided by the compressed overtravel spring 26 is sufficiently high to prevent overtravel actuation under normal conditions. The screw bore 30B in the overtravel piston 30 constrains an outside threaded surface 34A of a plunger 34. A shield 36 threads onto the plunger 34 and rests on a top piston surface 30E of overtravel piston 30. A jam nut 38 threads onto the plunger 34 until it stops against a top shield surface 36A on shield 36. A plunger end 40 attaches to a top surface 34B of the plunger 34.

Detailed Description of Alternate Embodiments

Figure 17:
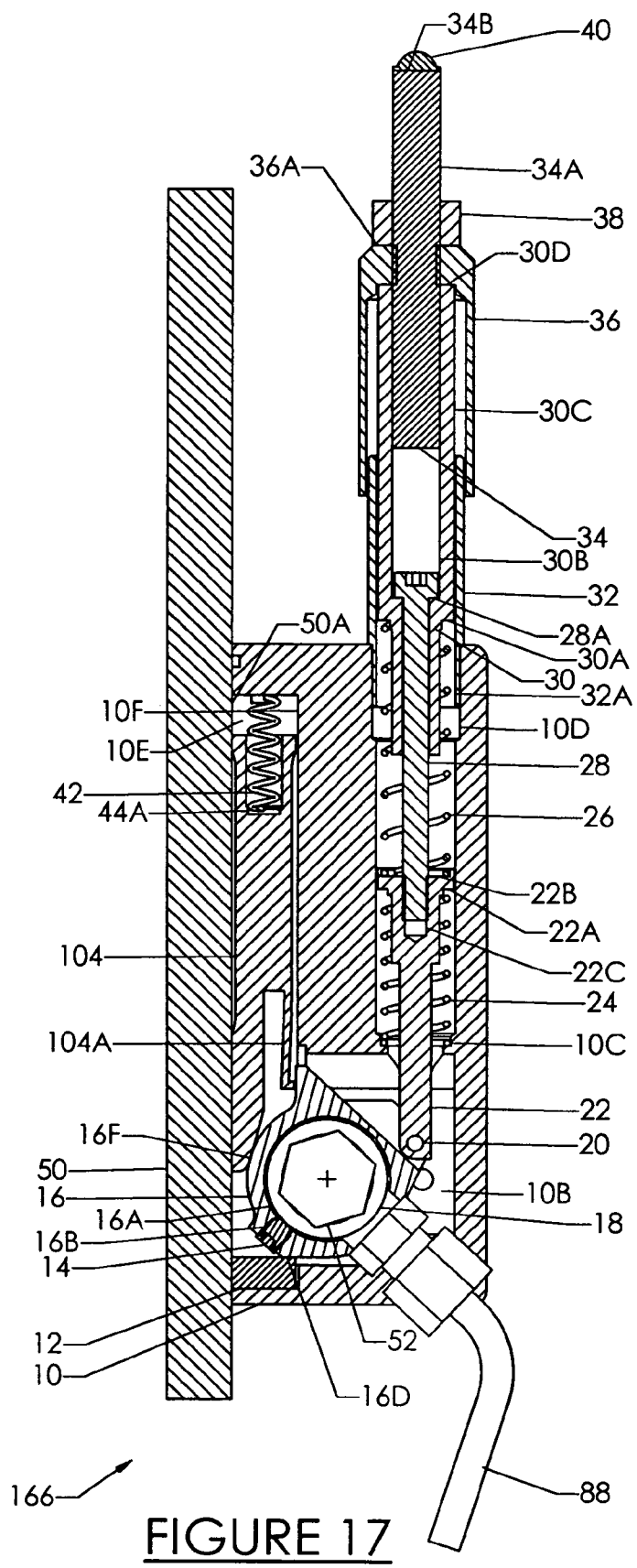
FIG. 17 is a longitudinal sectional view of an alternate embodiment of a coolant delivery apparatus with a cantilever latch member.

FIG. 17 is similar to FIG. 12 except that it shows a cantilever latch apparatus 166 wherein a cantilever latch brake 104 replaces block 44. A cantilever latch feature 104A is integrated into cantilever latch brake 104, replacing latch pin 48 and latch spring 46. The brake/latch arrangement operates similar to the block/latch arrangement discussed previously. In this embodiment, the cantilever feature 104A provides the force previously provided by latch spring 46. Apparatus 166 might offer cost savings over nozzle apparatus 84 through reduced assembly time and part count reduction.

Figures 18A, 18B:
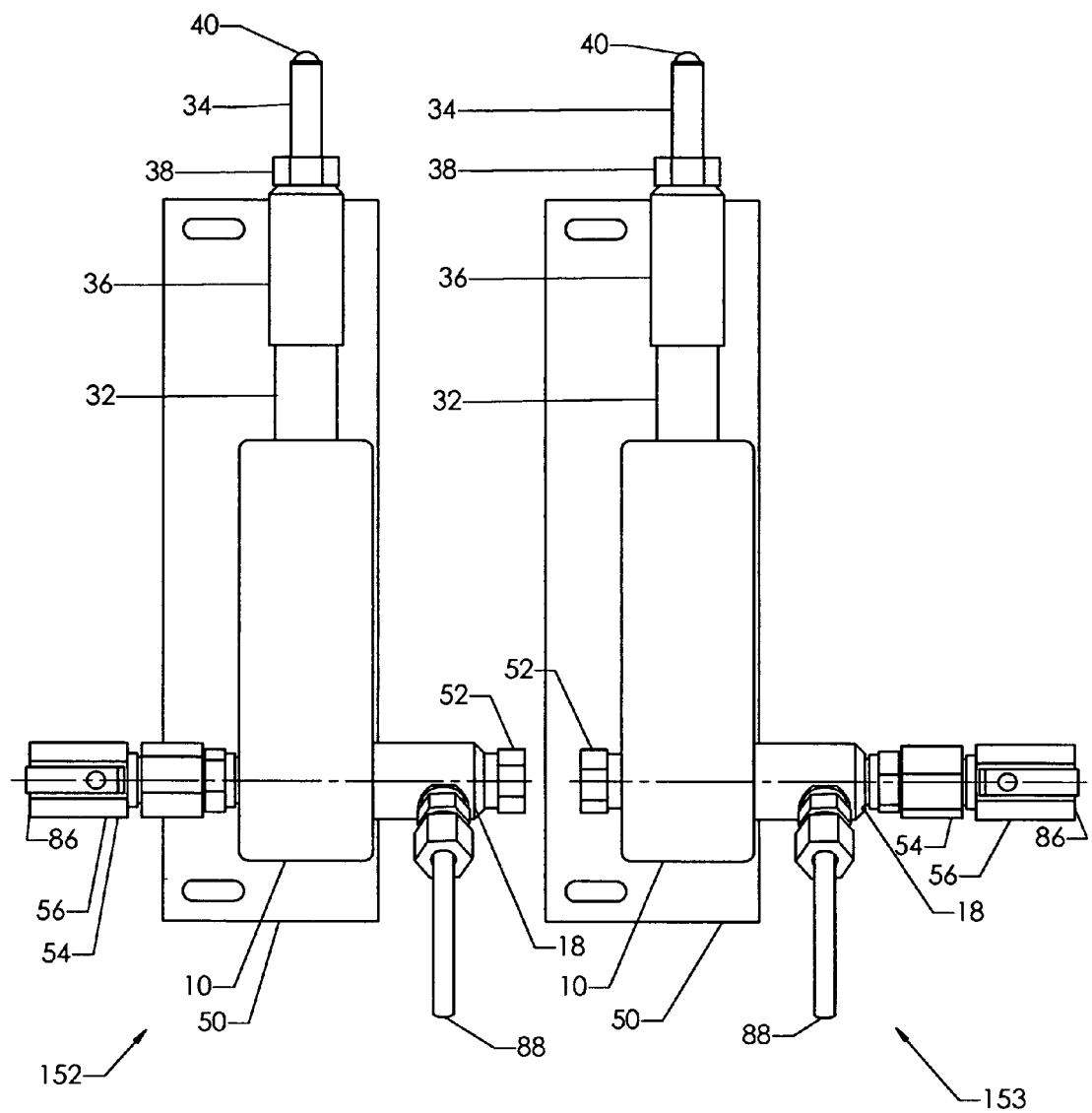
FIGS. 18A and 18B are side elevational views of alternate forms of apparatus in accordance with the present invention.

FIG. 18A is similar to FIG. 11 except it shows a mirror image apparatus 152 with the nozzle 88 located at the rear. This embodiment enables additional installation options by locating the nozzle 88 to the rear of the housing.

FIG. 18B is similar to FIG. 18A except the coolant supply is shown routed through the nozzle end of the apparatus 153.

Detailed Description of Another Preferred Embodiment of Invention

Another preferred embodiment of a coolant nozzle apparatus is illustrated in FIGS. 19–22. Many features in this embodiment have a slightly different appearance than their counterparts described in the previously described preferred embodiment, yet they have a similar function. To help the reader associate these similar parts, a numbering scheme is implemented wherein 200 has been added to each number to correlate similar parts. The previously described preferred embodiment includes a coolant nozzle apparatus 84. In this embodiment, a similar coolant nozzle apparatus is identified with the number 284.

Figure 19:
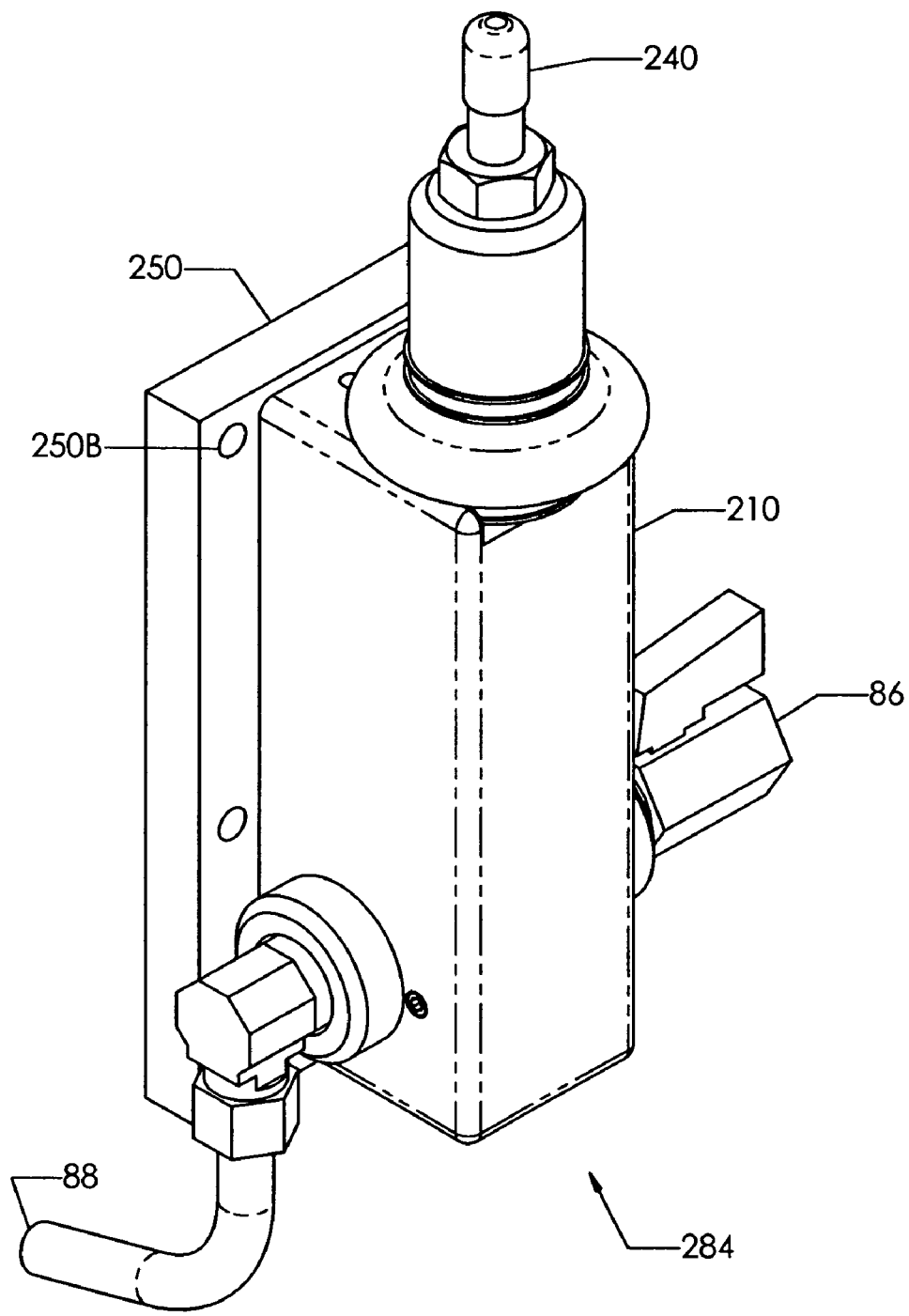
FIG. 19 is an isometric view of another preferred embodiment of the apparatus of the present invention.

In FIG. 19, an isometric view of a coolant delivery nozzle apparatus 284 is shown. A base plate 250 provides holes 250B for screw type fasteners that mount nozzle apparatus 284 to head member 80. Base 250 is connected to a housing 210 using screw type fasteners. Coolant inlet 86 is located to the rear of nozzle apparatus 284. Nozzle 88 is located to the front of nozzle apparatus 284. A plunger end 240, located at the top of the nozzle apparatus 284, is the member of nozzle apparatus 284 that contacts the stop member 82 as described in the discussion of FIG. 1 above. A mirror-image version of this embodiment, wherein the nozzle is at the rear and the inlet 86 is in the front, can be accomplished by simply assembling parts in a mirror-image fashion.

Figures 20A, 20B:
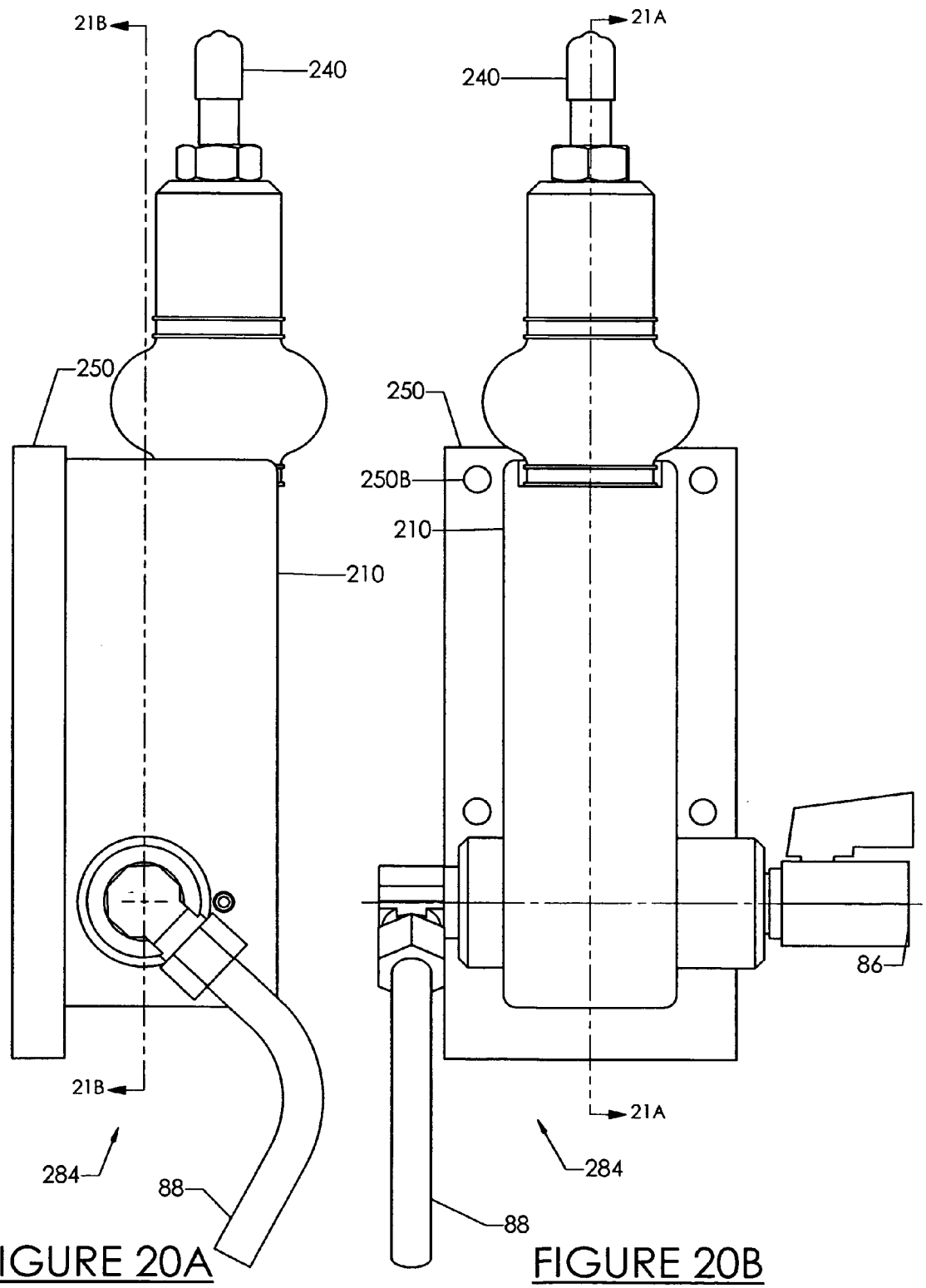
FIG. 20A is a front elevational view of the embodiment shown in FIG. 19.
FIG. 20B is a side elevational view of the embodiment shown in FIG. 19.

FIGS. 20A and 20B show a front and right side elevational view of nozzle apparatus 284 in its home position (views showing the machining center 100 in the nozzle home position are illustrated in FIGS. 3 & 8). Section line 21A–21A shows the location of the cutting plane of Section 21A–21A, illustrated in FIG. 21A. Section line 21B–21B shows the location of the cutting plane of Section 21B, illustrated in FIG. 21B.

Figures 21A, 21B, 21C:
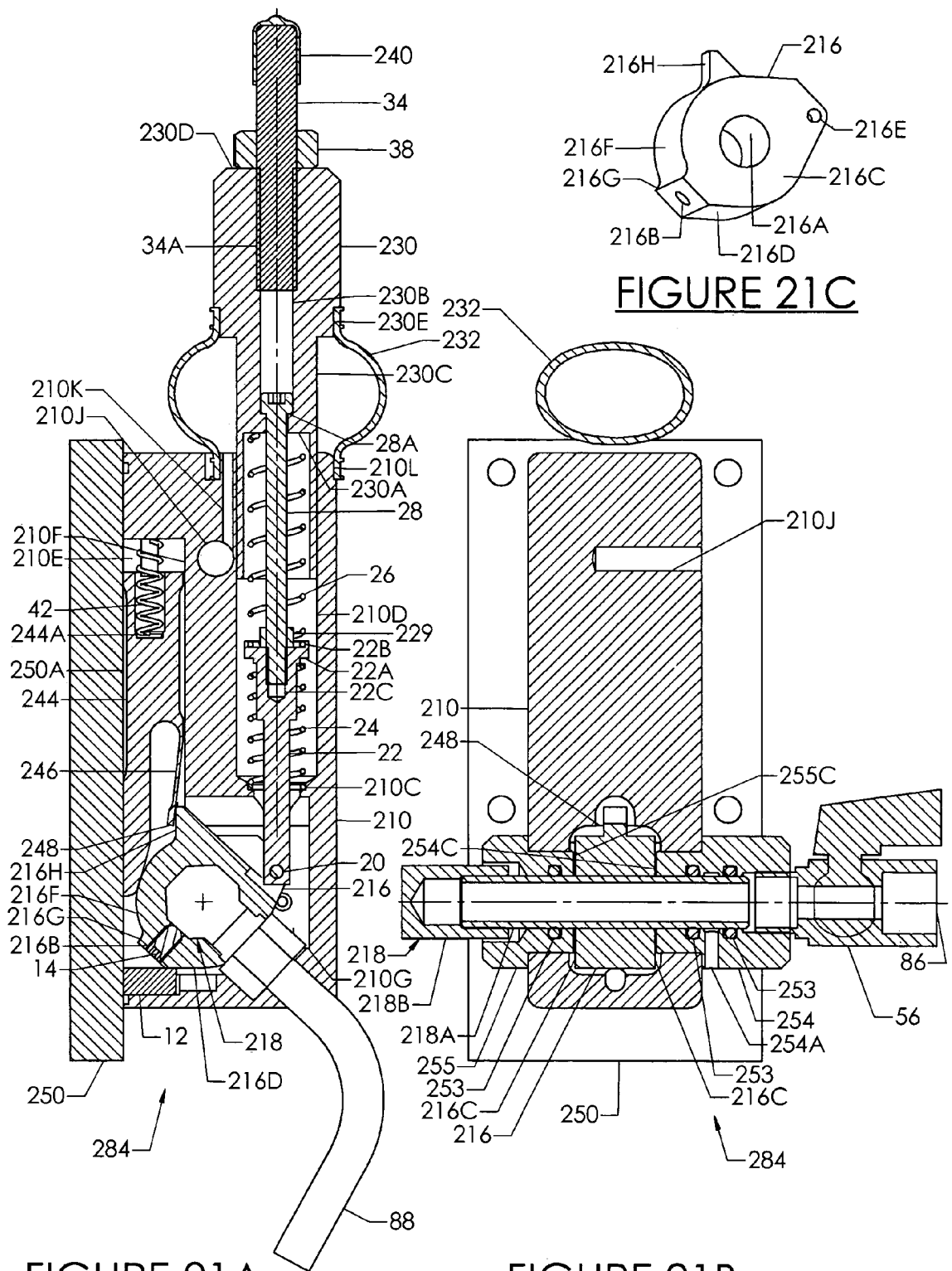
FIG. 21A is a front sectional view of the embodiment shown in FIG. 19, taken about line 21A—21A of FIG. 20B, illustrating the home position.
FIG. 21B is a side sectional view of the embodiment shown in FIG. 19, taken about line 21B—21B of FIG. 20A, illustrating the home position.
FIG. 21C is an enlarged isometric view of the crank.

Front and right longitudinal section views of nozzle apparatus 284 in its home position are illustrated in FIGS. 21A and 21B. FIG. 21A is similar to FIG. 12. Shaft assembly 218, and nozzle 88 are shown uncut by the section cut to better illustrate the relationship of the nozzle 88 to the position of nozzle apparatus 284. Member features share a common member number but have unique alphabetic suffixes. For example, hole 216B is a feature on crank arm 216. An isometric view of a crank arm 216 is shown in FIG. 21C to clarify the numerous features of crank arm 216.

Housing 210 serves to integrate the various components in nozzle apparatus 284. An inlet bushing 254, shown in FIG. 21B, interfaces with a bore in the rear of housing 210 using a cylindrical snap fit. Valve 56 threads into the right end (rear) of inlet bushing 254. Coolant inlet 86 is located in the right end (rear) of valve 56. A coolant supply line (not shown) connects pressurized coolant to the coolant inlet 86. Inlet bushing 254 provides a sealed passage for pressurized cooling fluid between the non-rotating valve 56 and a rotating shaft assembly 218. The rear o-ring 253 shown in the inlet bushing 254 seals against the cooling fluid pressure. Drain port 254A in inlet bushing 254 serves to drain any cooling fluid that might get past rear O-ring 253. The front O-ring 253 shown in the inlet bushing 254 operates at ambient pressure and keeps contamination out of housing 210. Valve 56 allows the machining center operator to shut off coolant supplied to nozzle apparatus 284. The valve 56 is a conventional component, previously described in the discussion of FIG. 11. The machining center 100 is also described in the discussion of FIG. 11.

A nozzle-end bushing 255 interfaces with a bore in the front of housing 210 using a cylindrical snap fit. The purpose of the O-ring 253 in bushing 255 is to keep environmental contamination out of housing 210.

Shaft assembly 218 acts both as an axle and a coolant passageway. The shaft 218A pivots in a bearing bore 255A, and 254B, provided by nozzle-end bushing 255 and inlet bushing 254. Coolant flows from inlet bushing 254 into the rear of shaft assembly 218 and out a shaft elbow 218B. Nozzle 88 connects to shaft elbow 218B and channels the coolant into the coolant stream 90.

An arm shaft bore 216A in a crank arm 216 fits snugly on the outside diameter of cylindrical shaft surface 218A. The crank arm 216 provides thrust bearing surfaces 216C that contact bushing thrust surfaces 255C and 254C, provided by nozzle-end bushing 255 and inlet bushing 254, to constrain the fore-aft axial position of the shaft assembly 218.

A set screw 14, shown in FIG. 21B, threads into a hole 216B in crank arm 216 and prevents rotational and axial motion of crank arm 216 with respect to shaft assembly 218. A stop pin 12, which presses into a bore in housing 210, limits counterclockwise rotation by contacting a crank stop surface 216D on crank arm 216. An upward vertical force applied by a crank pin 20 to a crank pin bore 216E in crank 216 produces a counterclockwise moment in crank arm 216. A connecting rod 22 transmits the upward vertical force from a compressed crank spring 24 to the crank pin 20. The lower end of crank spring 24 seats in a spring bore 210C in housing 210. The upper end of crank spring 24 seats against a flange 22A on connecting rod 22, urging connecting rod 22 upward.

Brake 244 is similar to brake 44 of the previously described preferred embodiment except brake 244 utilizes a cantilever style brake latch rather than a pin latch as described in FIG. 12. There are two brake springs 42, one fore and one aft of the Section A—A cutting plane. To simplify discussion, a singular brake spring 42 is described. The compressed brake spring 42 seats in a brake spring bore 244A in a brake 244. The upper end of brake spring 42 seats against sealed housing 210. The force provided by brake spring 42 urges brake 244 downward. Latch boss 248 is urged to the right by cantilever latch feature 246. Rightward motion of boss 248 is limited by a latch release contact 216H on crank arm 216 when nozzle apparatus 284 is in this position. Brake 244 is urged downward by brake springs 42, imparting a frictional force on crank arm 216. Housing 210 provides a fore brake surface and an aft housing brake surface 210E for guiding brake 244, as well as a leftward-facing housing surface 210F, which the right face of brake 244 slides against. The left face of brake 244 slides against a right-facing surface 250A of base 250.

An overtravel function is provided by an overtravel spring 26, an overtravel screw 28, an overtravel nut 229, and a piston 230. The lower end of overtravel spring 26 seats in a counterbore 22B in the top of connecting rod 22. The upper end of overtravel spring 26 seats against an overtravel spring base 230A of piston 230. An overtravel nut 229 threads partially up the overtravel screw and the overtravel screw 28 threads into a threaded screw hole 22C in the top of connecting rod 22. A lower head surface 28A of the overtravel screw 28 seats against the bottom of a screw head bore 230B in piston 230, providing an opposing force to the compressed overtravel spring 26. Piston shaft 230C of piston 230 slides in a piston bore 210D in housing 210. The lower end of a seal boot 232 fits over a housing boss 210L in housing 210. The upper end of a seal boot 232 fits over a piston boss 230E on piston 230. In the overtravel position (not shown), contact between piston 230 and housing 210 limits overtravel stroke.

The overtravel function accommodates excess travel of the head member 80 that might occur if the head member 80 is moved beyond its normal operating range. The force provided by the compressed overtravel spring 26 is of sufficient strength to prevent overtravel actuation under normal conditions. Overtravel nut 229 provides a wide-based stop for overtravel screw 28. The seal boot 232 keeps foreign matter out of nozzle apparatus 284. Horizontal exhaust port 210J and vertical exhaust port 210K in housing 210 provide a duct for exhausting air displaced by piston 230 and seal boot 232.

The upper portion of screw head bore 230B in piston 230 provides a threaded interface for an outside threaded surface 34A of an plunger 34. A jam nut 38 threads onto the plunger 34 until it stops against a piston top surface 230D on piston 230. A plunger end 240 attaches to a top surface 34B of the plunger 34. Plunger end 240 serves to minimize the noise produced when the nozzle apparatus 284 contacts the stop member 82. Plunger 34 is used to calibrate the nozzle apparatus 284 to the machining center 100. When the nozzle apparatus 284 is first installed in the machining center 100, nozzle apparatus 284 is mounted to the head member 80 and the head member 80 is moved to the highest position in its normal operating range. The plunger 34 is then adjusted upwards (by turning it with respect to piston 230) until the nozzle apparatus 284 is actuated to the nozzle clockwise limit position shown in FIG. 21A. The jam nut 38 is then tightened against piston 230 to lock the plunger 34 into place.

Figures 22A, 22B:
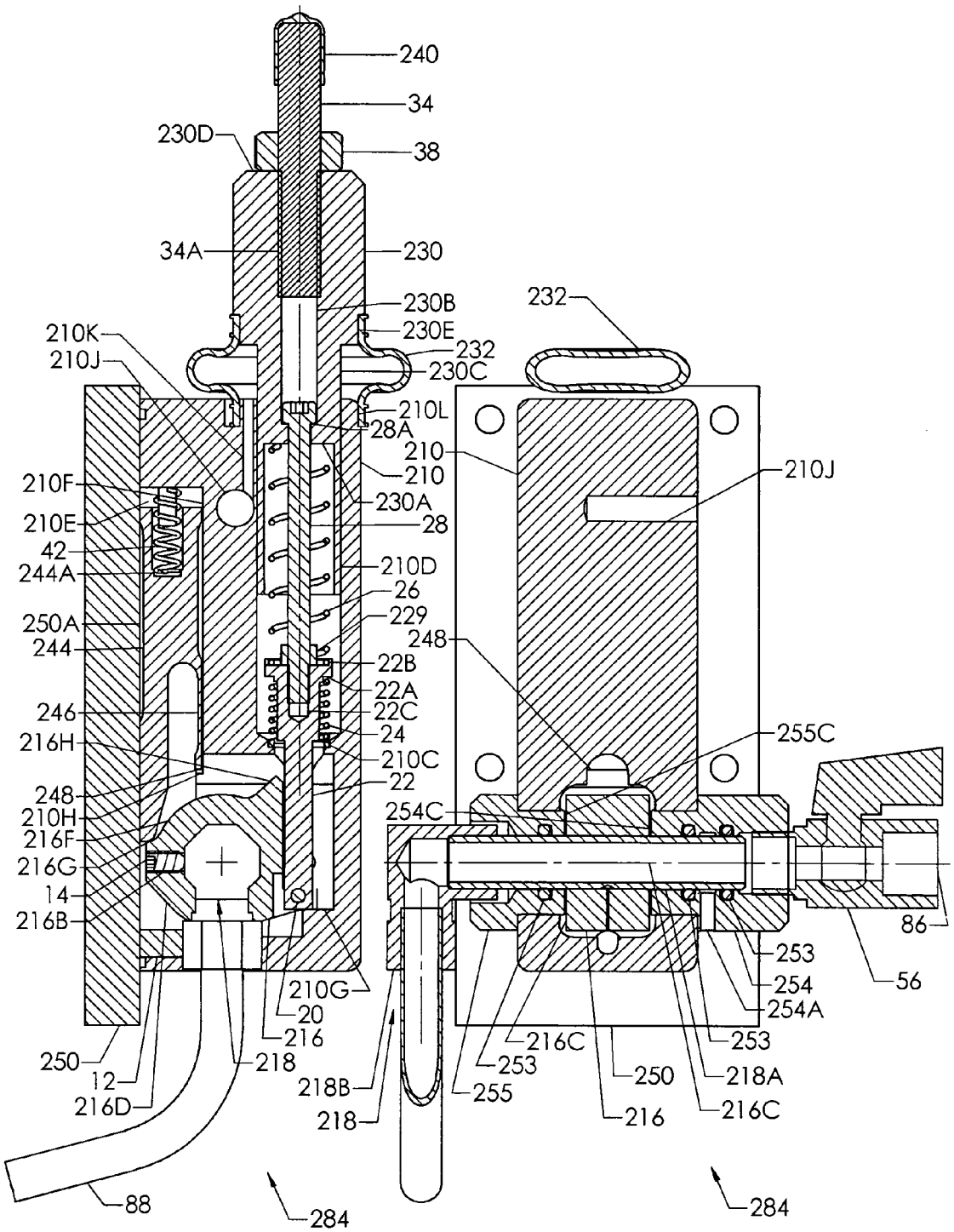
FIGS. 22A and 22B are front and side sectional views of the embodiment shown in FIG. 19, illustrating the clockwise limit position.

FIG. 22A shows a front longitudinal section view of nozzle apparatus 284 in its clockwise limit position (a top-level view of this position is shown in FIGS. 6 and 7). In FIG. 6, head member 80 moves upward, plunger end 240 of nozzle apparatus 284 contacts the stop member 82, and nozzle 88 rotates clockwise to the nozzle clockwise limit position.

As FIG. 22A illustrates, nozzle apparatus 284 is at its clockwise limit in this position. Connecting rod 22 contacts a clockwise stop surface 210G on housing 210, preventing additional rotation of crank arm 216. A brake cam surface 216G on crank arm 216 urges brake 244 upward against the force of brake spring 42. Cantilever latch feature 246 urges latch boss 248 rightward into a position above brake latch stop surface 210H in housing 210.

In FIG. 22B, a right side longitudinal section view of nozzle apparatus 284 in its clockwise limit position is shown. Features shown in this figure have been described in the discussion of FIG. 21B above.

Detailed Description of an Alternate Form of Invention

FIG. 23A illustrates in isometric view a typical embodiment of a coolant delivery nozzle apparatus 384. A tool-changing device 95 is shown to clarify the interaction between the tool-changing sequence and the nozzle setting sequence. The nozzle apparatus 384 is shown in a machining center 400, mounted to a head member 80. A coolant supply hose (not shown), provided by machining center 400, connects to a coolant inlet 86 (not shown in this view) located at the rear of nozzle apparatus 384. Coolant exits nozzle apparatus 384 through a nozzle 318B (not shown in this view) and forms a coolant stream 90. The left surface of nozzle apparatus 384 mounts to the right surface of head member 80. Nozzle apparatus 384 is mounted near the bottom of head member 80 to permit unobstructed coolant access to tool 92. A stop bar 322 is mounted to stop member 382. A drive member 316 on nozzle apparatus 384 contacts stop bar 322 when the head member 80 approaches the upper limits of its travel. Nozzle apparatus 384 is aligned fore and aft with respect to head member 80 to achieve the desired interaction between coolant stream 90 and tool 92. The stop member 382 is part of the machining center enclosure in many cases. In some cases, stop bar 322 is attached to the machining center enclosure. In other cases, stop bar 322 is attached to another machining axis.

Nozzle apparatus 384 is actuated by moving head member 80 relative to stop member 382 until drive member 316 contacts stop bar 322. Moving head member 80 an additional amount causes drive member 316 to experience a downward force, thereby rotating a shaft 318 clockwise. With the coolant supply turned on, a machine operator aims the coolant stream 90 at a desired position on tool 92 by moving head member 80 up until shaft 318 rotates coolant stream 90 to the desired position. The operator programs the machine to automatically aim the coolant stream 90 by inserting a command in his part machining program to move the head member 80 up to the previously determined position that set the desired coolant stream position. He can associate this nozzle setting move with tool 92 by inserting the move command in his program following the command that changes to tool 92. Other nozzle settings for other tools can be programmed in a similar manner. With the modified part-machining program, the machining center will automatically aim the coolant stream as each tool executes its cutting operation.

FIG. 23B is a close up isometric view of the nozzle apparatus 384 showing key external features.

A housing 310 provides two holes 310A for screw type fasteners that mount nozzle apparatus 384 to head member 80. A stop bar post 322A is the portion of stop bar 322 that contacts drive member 316. A counterclockwise stop pin 313 contacts drive member 316 to limit counterclockwise rotation of shaft 318. A clockwise stop pin 312 contacts drive member 316 to limit clockwise rotation of shaft 318. FIG. 24A shows a front view of nozzle apparatus 384 in its clockwise limit position. A nozzle 318B is shown in this view in hidden lines. FIG. 24B shows a right side cross section view of nozzle apparatus 384. A housing bore 310D provides an axial constraint for outer surface 318A. Bearing friction between outer surface 318A and housing bore 310D provides a braking means for maintaining the position of shaft 318 with respect to housing 310. A front housing surface 310B interfaces with a drive member rear surface 316A and a rear housing surface 310C interfaces with a shaft thrust surface 318D to constrain fore-aft motion of shaft 318 with respect to housing 310.

FIG. 24C shows a right-rear isometric view of nozzle apparatus 384. Stop bar mounting holes 322B are provided for mounting stop bar 322 to stop member 382 using screw type fasteners. Cooling fluid is connected from the machining center's pressurized coolant source to inlet 86. Cooling fluid flows through inlet 86 to a shaft inlet 318C and out the nozzle 318A to form coolant stream 90.

FIG. 25A shows head 80 in a Low Tool Change Position. The head 80 pauses in this position for the tool changing apparatus 95 to move from left to right to grip tool 92. A coolant stream 90 is shown aimed at the tip of tool 92.

FIG. 25B shows head 80 in the Low Tool Change Position. Coolant has been turned off and the tool changing apparatus 95 has moved from left to right to grip tool 92. Head 80 releases tool 92 in this position.

FIG. 25C shows head 80 in a transitional position as it moves to a High Tool Change Position. This view is shown to clarify how the stop bar 322 flexes as nozzle apparatus 384 moves to a Clockwise Limit Position.

FIG. 25D shows head 80 in a High Tool Change Position. The head 80 is moved to this position to clear the top of the tool 92. Nozzle apparatus 384 is in the Clockwise Limit Position.

FIG. 25E shows head 80 in the High Tool Change Position. Tool changing apparatus 95 rotates tool 94 under head 80.

FIG. 25F shows head 80 in a transitional position as it moves back down to the Low Tool Change Position. This view is shown to clarify how stop bar 322 flexes as nozzle apparatus 384 moves to a Nozzle Home Position.

FIG. 25G shows head 80 in the Low Tool Change Position. The tool changing apparatus 95 is still holding tool 94. Head 80 grips tool 94 in this position. Nozzle apparatus 384 is in the Nozzle Home Position.

FIG. 25H shows head 80 in the Low Tool Change Position. The tool changing apparatus 95 has moved from right to left to release tool 94. Head 80 continues to hold tool 94. Nozzle apparatus 384 is still in the Nozzle Home Position.

FIG. 25I shows head 80 in the Nozzle Aiming Position. This additional head position has been programmed specifically to set the coolant nozzle. Nozzle apparatus 384 is in a Nozzle Aimed Position. Coolant stream 90 is aimed at tool 94.

FIG. 25J shows head 80 in a Cutting Position. Nozzle apparatus 384 maintains the Nozzle Aiming Position and coolant stream 90 continues to contact tool 94 as the cutting operation is executed.

From the foregoing, the automated coolant delivery system of this invention is actuated simply by preprogramming the head 80 to move upward a prescribed distance following a tool change. It achieves machine-time efficiency by utilizing existing tool change positions to initiate its homing sequence. Furthermore, the automated coolant delivery system of this invention has additional advantages in that it eliminates the cost of a motor and its associated electronic control hardware and cables by utilizing the relative mechanical motion between a head member and a fixed member. It provides a solution that can be easily retrofitted by machine shop personnel by eliminating the need to wire into the machine tool control system. It minimizes the need for custom components by eliminating cables and additional electronic control hardware. It further enhances standardization and reduces implementation cost by offering a solution that utilizes existing software. It offers more than adequate resolution by utilizing the highly accurate existing motor control system provided by the machine tool.

Although the systems described above contain many specific examples, these should not be construed as limiting the scope of the invention but as merely providing illustrations of some of the presently preferred embodiments of this invention. For example, while a single cylindrical coolant stream has been shown in the included Figures, multiple streams, or a fan spray pattern can be employed to optimize the effect of the coolant. Likewise, while a vertical axis machining center has been shown in the above Figures, the present invention also works well with horizontal axis machine tools such as lathes and horizontal machining centers. Other types of machining such as Electrical-Discharge Machining (EDM) also require coolant stream positioning and can benefit from this invention as well.

It is therefore to be understood that the above and other modifications and changes may be made without departing from the spirit and scope of the present invention as defined by the appended claims and reasonable equivalents thereof.

I claim:

1. The method for automatically positioning a nozzle on a machine tool for discharge of a coolant stream onto each of a plurality of cutting tools which is to be advanced into a cutting position with respect to a workpiece comprising the steps of:

supplying a coolant to said nozzle;

pivotally mounting said nozzle in facing relation to each of said plurality of cutting tools to be advanced into cutting position;

pivoting said nozzle without the use of a motor to adjust the angle of attack of the coolant stream whereby to cause the coolant stream to intersect a portion of each of said plurality of cutting tools which is advanced into cutting position; and retaining said nozzle in fixed relation to each of said plurality of cutting tools when each of said plurality of cutting tools is advanced into cutting position.

2. The method according to claim 1 including the step of providing a linear drive member to pivot said nozzle, and correlating the distance of movement of said linear drive member with a diameter or length of each of said plurality of cutting tools advanced into cutting position whereby to automatically adjust the angle of attack of the coolant stream to strike a portion of each said cutting tool which is advanced into cutting position.

3. The method according to claim 1 including the step of returning said nozzle to a reference position between movement of successive cutting tools into cutting position.

4. The method according to claim 1 including the step of advancing said nozzle from a reference position to a coolant-applying position for each of said plurality of cutting tools, and holding said nozzle in each said coolant-applying position.

5. The method for automatically positioning a nozzle on a machine tool for discharge of a coolant stream onto each of a plurality of cutting tools which is in a cutting position with respect to a workpiece comprising the steps of:
   supplying a coolant to said nozzle;
   positioning said nozzle in facing relation to each of said plurality of cutting tools as it is advanced into the cutting position; and
   advancing said nozzle without the use of a motor to adjust the angle of attack of said coolant stream whereby to cause the coolant stream to intersect a portion of said tool which is advanced into cutting position.

6. The method according to claim 5 including the step of returning said nozzle into a reference position after movement of each of said plurality of cutting tools into a cutting position.

7. The method according to claim 5 including the step of providing a linear drive member to pivot said nozzle and for adjusting said drive member to advance in accordance with each change in length or diameter of each of said plurality of cutting tools advanced into the cutting position whereby to change the angle of attack of the coolant stream to strike said portion of said respective cutting tool advanced into the cutting position.

8. The method for automatically positioning a nozzle on a machine tool for discharge of a coolant stream onto each of a plurality of cutting tools which is to be advanced into a cutting position with respect to a workpiece comprising the steps of:
   supplying a coolant to said nozzle;
   pivotally mounting said nozzle in facing relation to each of said plurality of cutting tools to be advanced into cutting position;
   pivoting said nozzle in response to movement of said machine tool to adjust the angle of attack of the coolant stream whereby to cause the coolant stream to intersect a portion of each of said plurality of said cutting tools which is advanced into cutting position;
   retaining said nozzle in fixed relation to each of said plurality of cutting tools when each of said plurality of cutting tools is advanced into cutting position; and
   providing a linear drive member to pivot said nozzle and allowing said drive member to move independently of said nozzle after said nozzle has reached a coolant-applying position.

* * * * *